United States Patent
Shim et al.

(10) Patent No.: US 10,120,992 B2
(45) Date of Patent: Nov. 6, 2018

(54) MOBILE TERMINAL AND METHOD FOR CONTROLLING THE SAME

(71) Applicant: LG ELECTRONICS INC., Seoul (KR)

(72) Inventors: Hongjo Shim, Seoul (KR); Mihyun Park, Seoul (KR); Hyunok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/837,723

(22) Filed: Dec. 11, 2017

(65) Prior Publication Data
US 2018/0165437 A1    Jun. 14, 2018

(30) Foreign Application Priority Data
Dec. 13, 2016    (KR) .......................... 10-2016-0169766

(51) Int. Cl.
| | |
|---|---|
| *G06F 21/32* | (2013.01) |
| *G06K 9/00* | (2006.01) |
| *H04M 1/725* | (2006.01) |
| *H04N 5/33* | (2006.01) |
| *H04N 5/232* | (2006.01) |

(Continued)

(52) U.S. Cl.
CPC .............. *G06F 21/32* (2013.01); *G06K 9/00* (2013.01); *G06K 9/00255* (2013.01); *G06K 9/00342* (2013.01); *G06K 9/00604* (2013.01); *G06K 9/20* (2013.01); *G06K 9/209* (2013.01); *G06T 7/20* (2013.01); *G06T 7/73* (2017.01); *H04M 1/02* (2013.01); *H04M 1/725* (2013.01); *H04M 1/72577* (2013.01); *H04N 5/232* (2013.01);

(Continued)

(58) Field of Classification Search
CPC .... G06F 21/32; G06K 9/209; G06K 9/00342; G06K 9/00255; G06K 9/00604; G06T 7/73; G06T 7/20; H04N 5/23219; H04N 5/33; H04M 1/72577; H04W 12/06
See application file for complete search history.

(56) References Cited

U.S. PATENT DOCUMENTS 9,454,698 B2 *    9/2016    Min .................... G06K 9/00604
2006/0192868 A1 *    8/2006    Wakamori ............ A61B 5/117
                                                                    348/294

(Continued)

FOREIGN PATENT DOCUMENTS

| KR | 10-2014-0109158 A | 9/2014 |
|---|---|---|
| WO | WO 2016/043405 A1 | 3/2016 |

(Continued)

*Primary Examiner* — Babar Sarwar
(74) *Attorney, Agent, or Firm* — Birch, Stewart, Kolasch & Birch, LLP

(57) ABSTRACT

A mobile terminal including a main body; a receiver disposed on the main body; an infrared unit disposed on the main body at a first distance from the receiver in a first direction and configured to output infrared rays; an iris recognition sensor disposed on the main body at a second distance from the receiver in a second direction opposite the first direction and configured to receive infrared rays reflected from a subject; and a low power image sensor disposed on the main body at a third distance from the receiver in the second direction and having a focal point matching a focal point of the iris recognition sensor, wherein the third distance is greater than the second distance.

17 Claims, 36 Drawing Sheets

(51) Int. Cl.
*G06T 7/73* (2017.01)
*G06T 7/20* (2017.01)
*G06K 9/20* (2006.01)
*H04M 1/02* (2006.01)
*H04W 12/06* (2009.01)

(52) U.S. Cl.
CPC ........... *H04N 5/23219* (2013.01); *H04N 5/33* (2013.01); *H04W 12/06* (2013.01)

(56) References Cited

U.S. PATENT DOCUMENTS

| | | | | |
|---|---|---|---|---|
| 2009/0009628 A1* | 1/2009 | Janicek | .................. | H04N 5/232 348/231.99 |
| 2010/0234077 A1* | 9/2010 | Yoo | ....................... | G06F 1/1626 455/566 |
| 2014/0267034 A1* | 9/2014 | Krulce | .................... | G06F 3/013 345/158 |
| 2014/0285686 A1* | 9/2014 | Cho | ..................... | G06K 9/2063 348/231.99 |
| 2015/0091794 A1* | 4/2015 | Ha | ......................... | G06F 3/013 345/156 |
| 2015/0227790 A1* | 8/2015 | Smits | ................. | G06K 9/00604 348/78 |
| 2015/0229759 A1* | 8/2015 | Wu | ................... | H04M 3/42042 455/567 |
| 2016/0212317 A1* | 7/2016 | Alameh | ................ | G06F 1/1684 |
| 2016/0275348 A1* | 9/2016 | Slaby | ................ | G06K 9/00604 |
| 2018/0012007 A1* | 1/2018 | Kim | ........................ | G06F 21/32 |

FOREIGN PATENT DOCUMENTS

| | | | | |
|---|---|---|---|---|
| WO | WO 2016043405 A1 * | 3/2016 | ........... | G06F 1/1694 |
| WO | WO 2016/117755 A1 | 7/2016 | | |
| WO | WO 2016117755 A1 * | 7/2016 | ............. | G06F 21/32 |

* cited by examiner

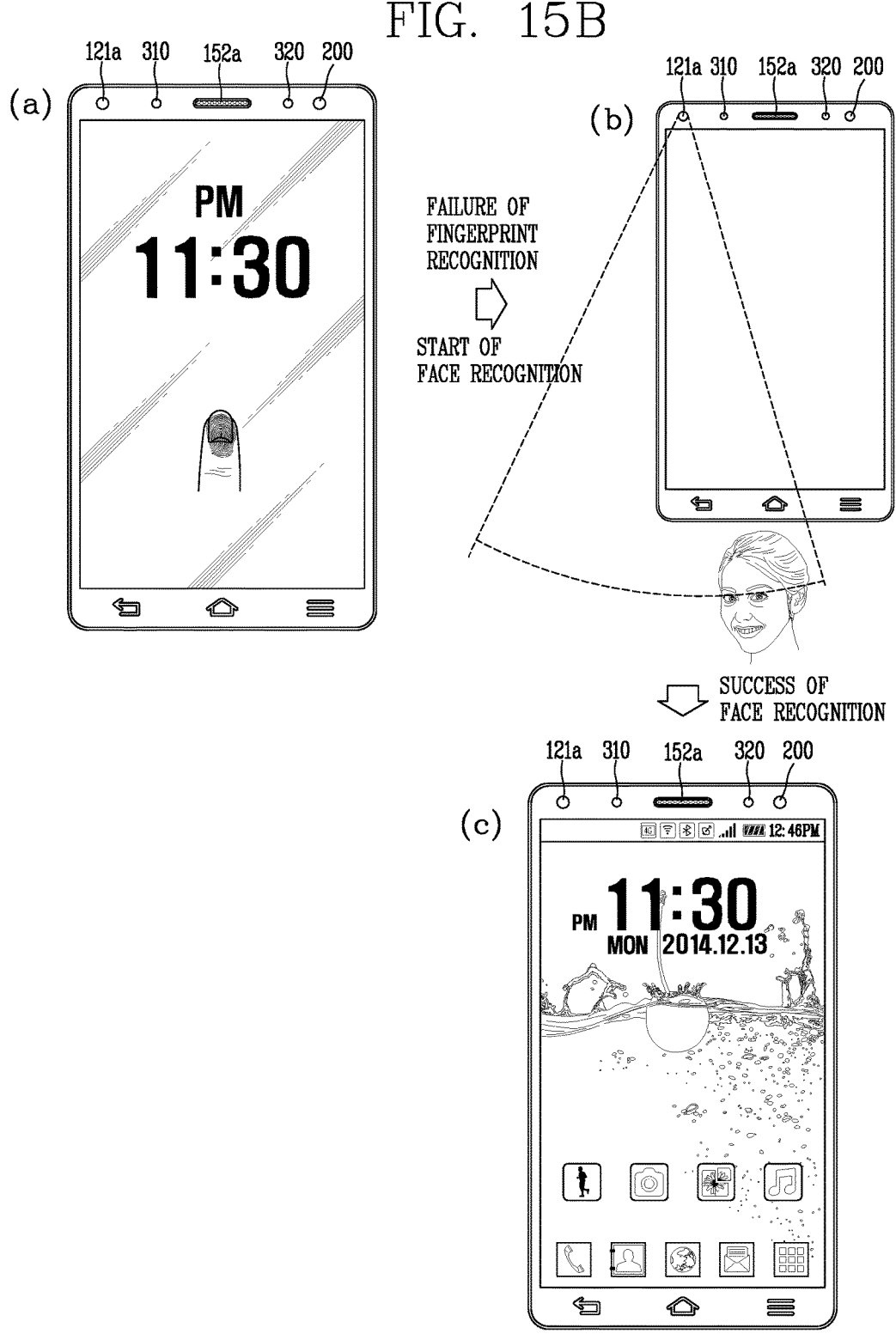

FIG. 16B
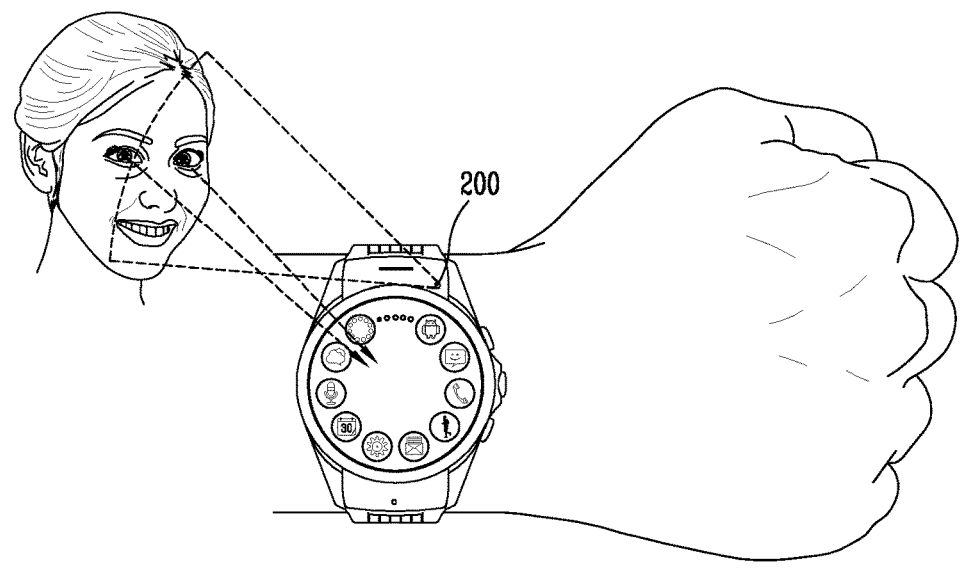
(a)
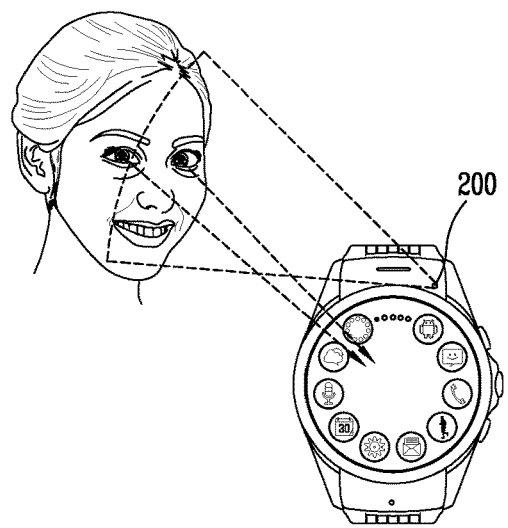
(b)

FIG. 17
(a) 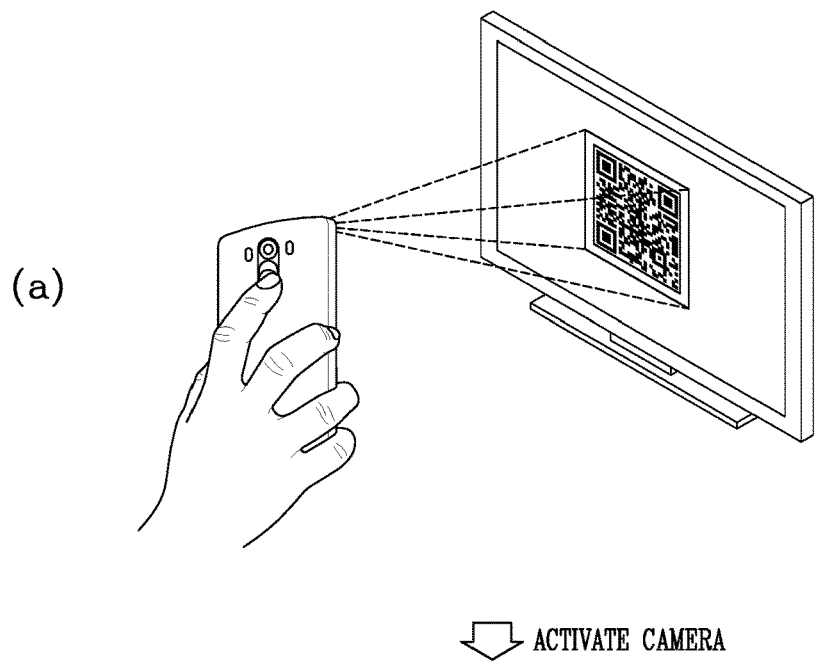
⇩ ACTIVATE CAMERA
(b) 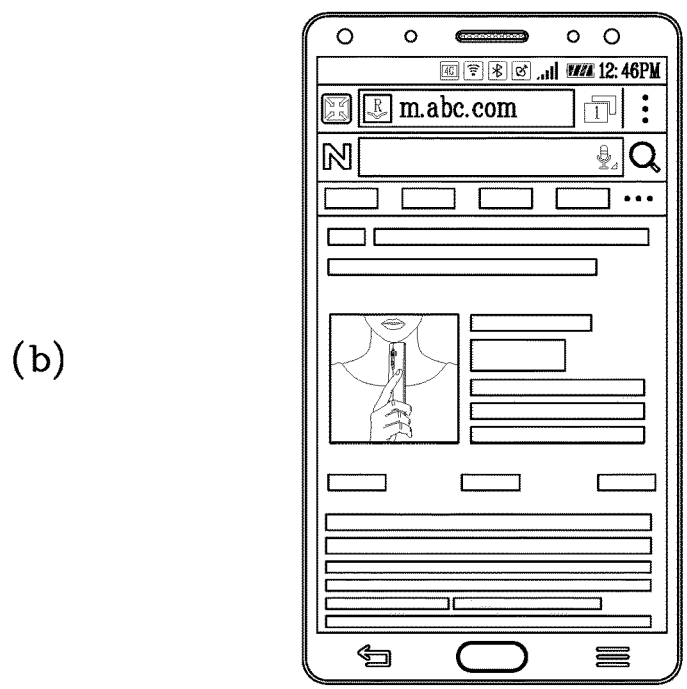

FIG. 18A
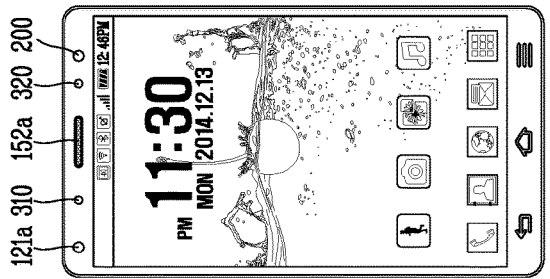
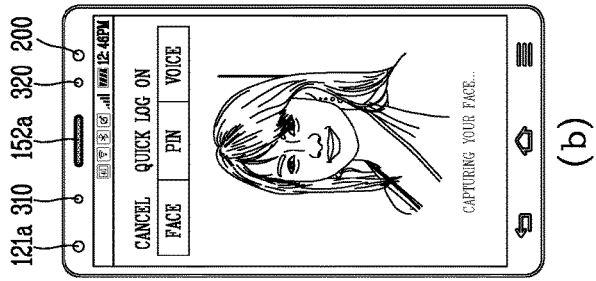
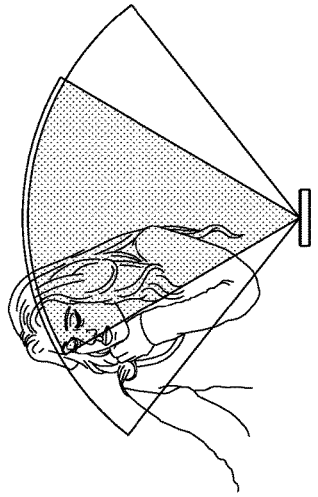
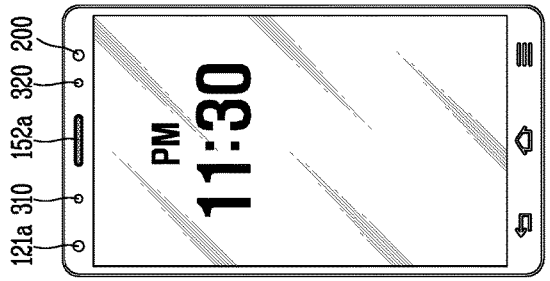

FIG. 18B
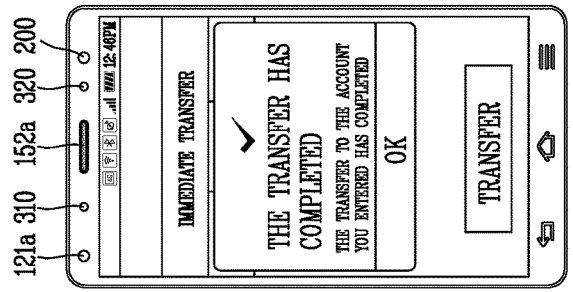
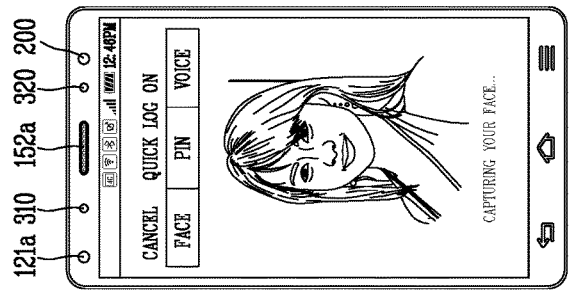
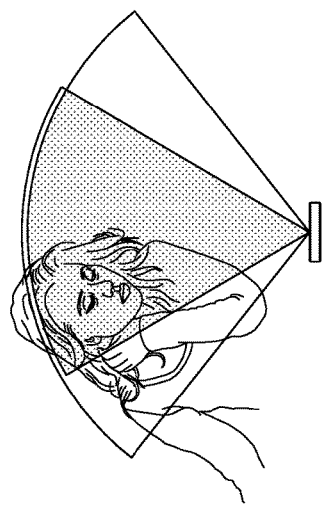
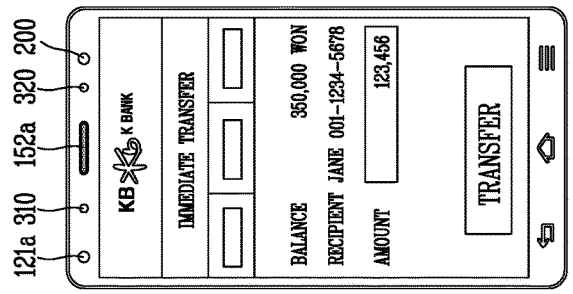
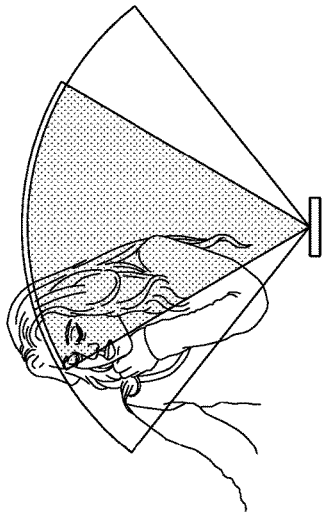

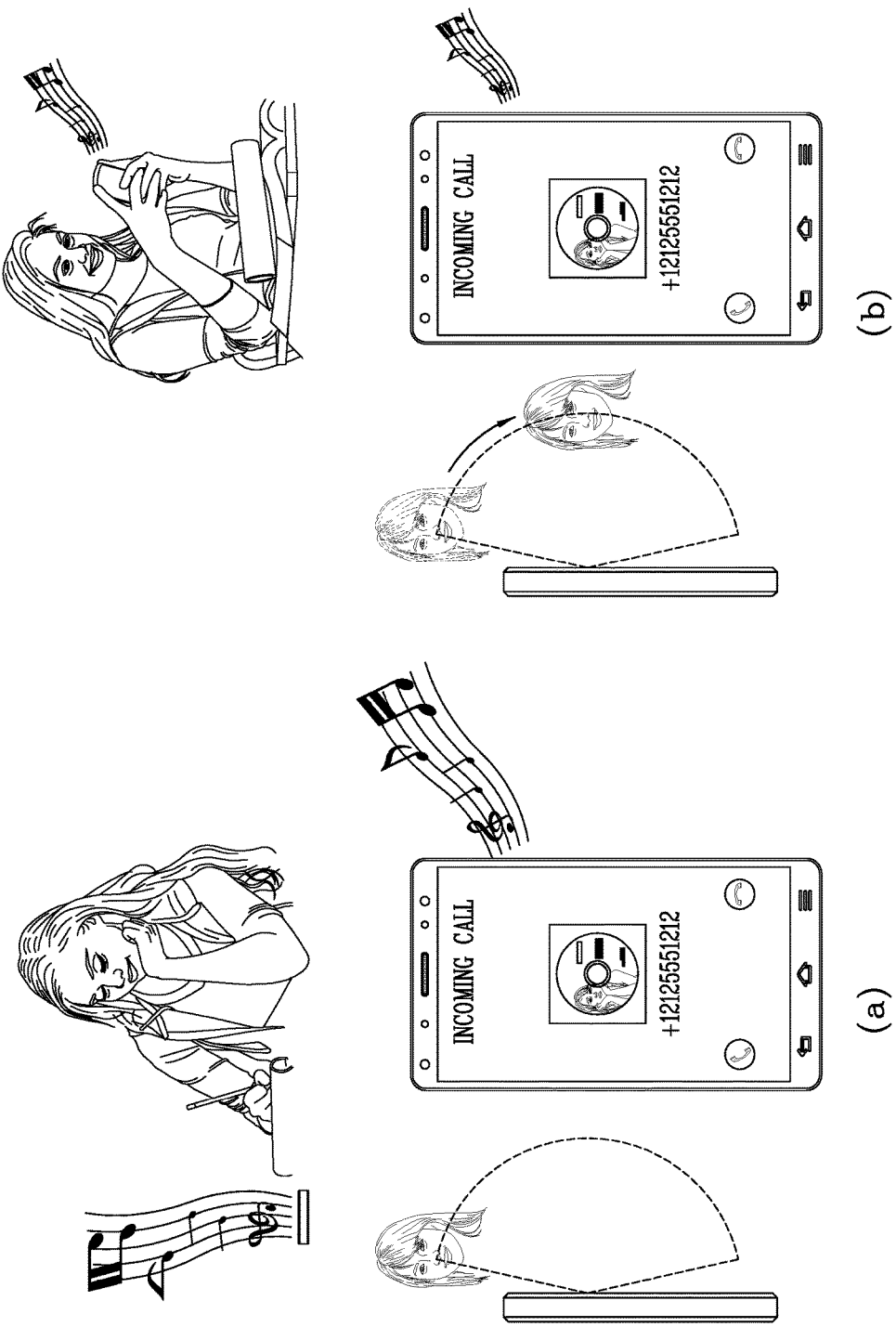

FIG. 20
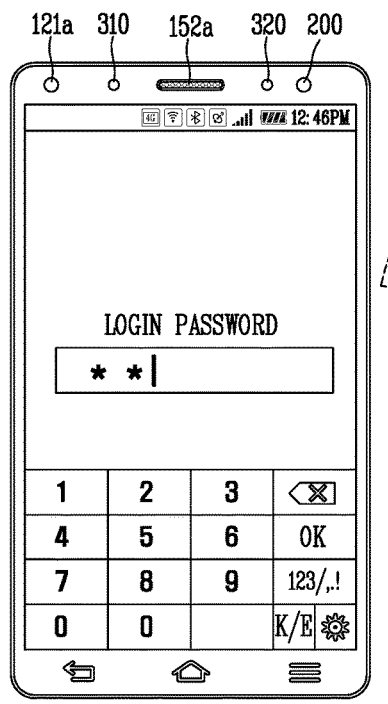
(a)
(b)
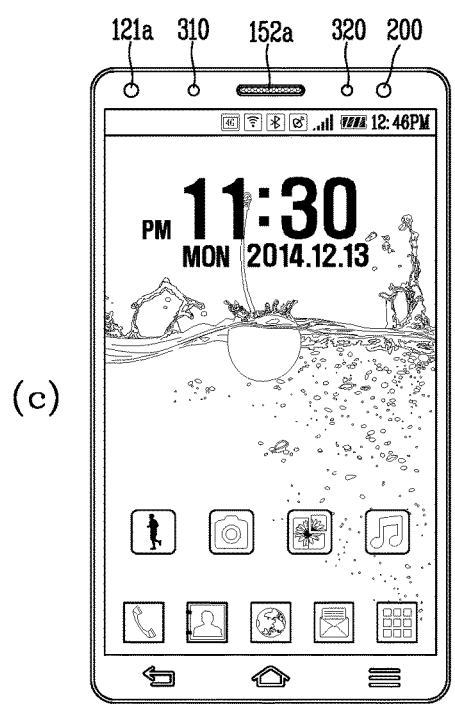
(c)

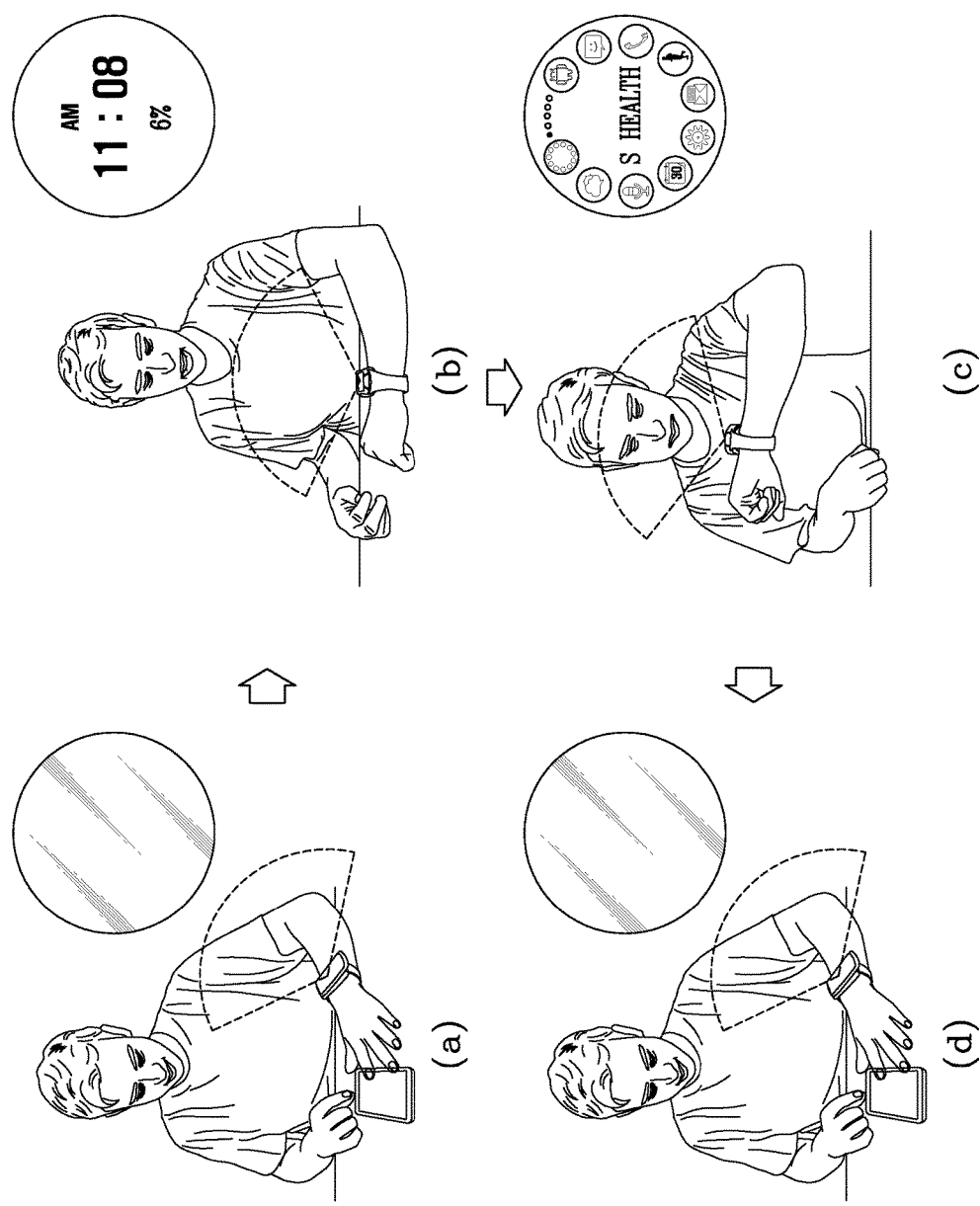

FIG. 21B
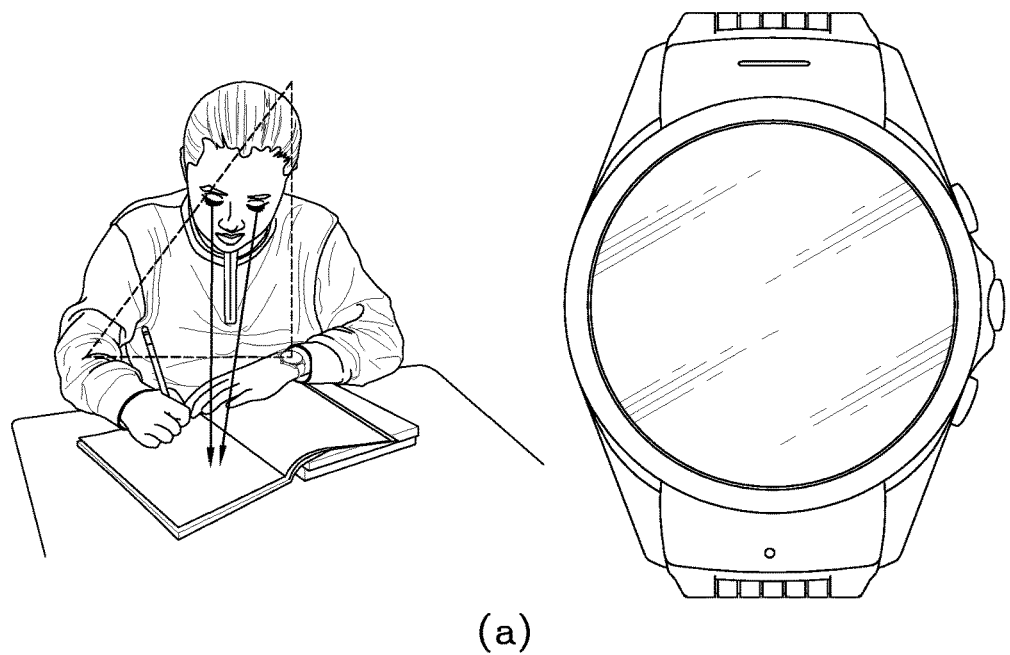
(a)
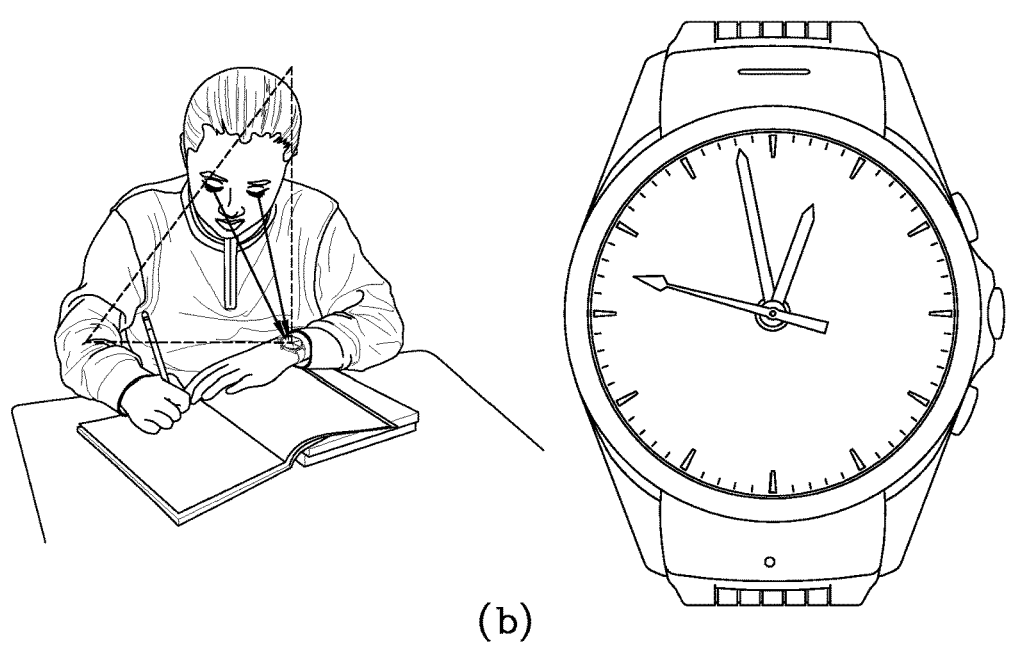
(b)

FIG. 23
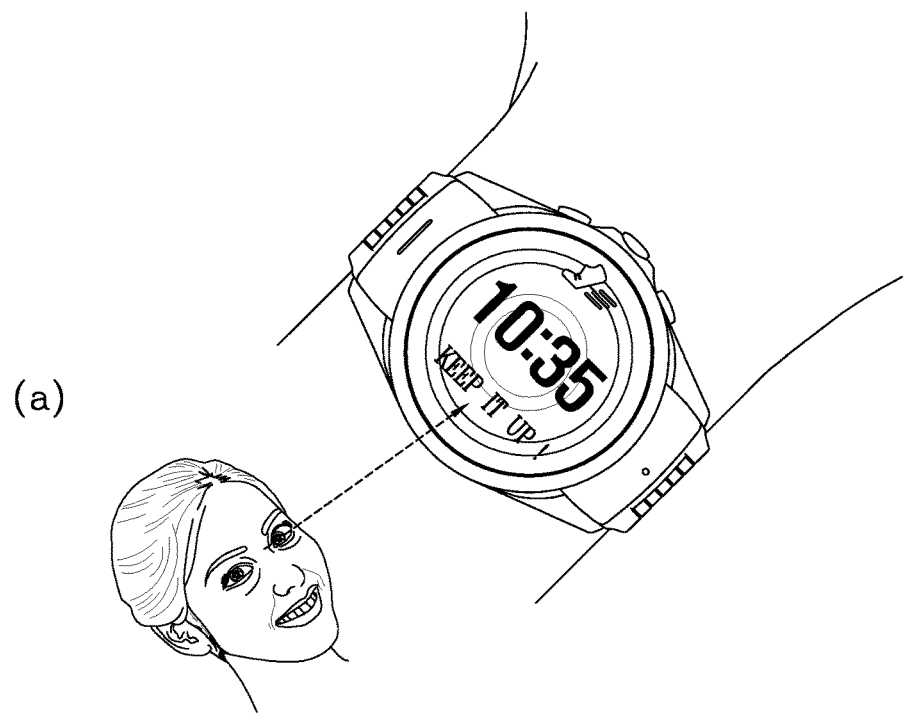
(a)
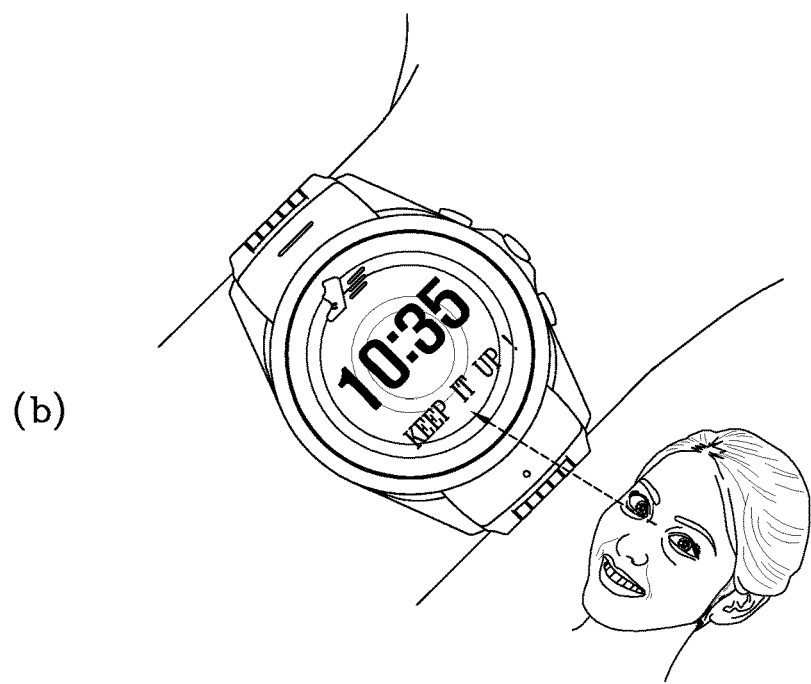
(b)

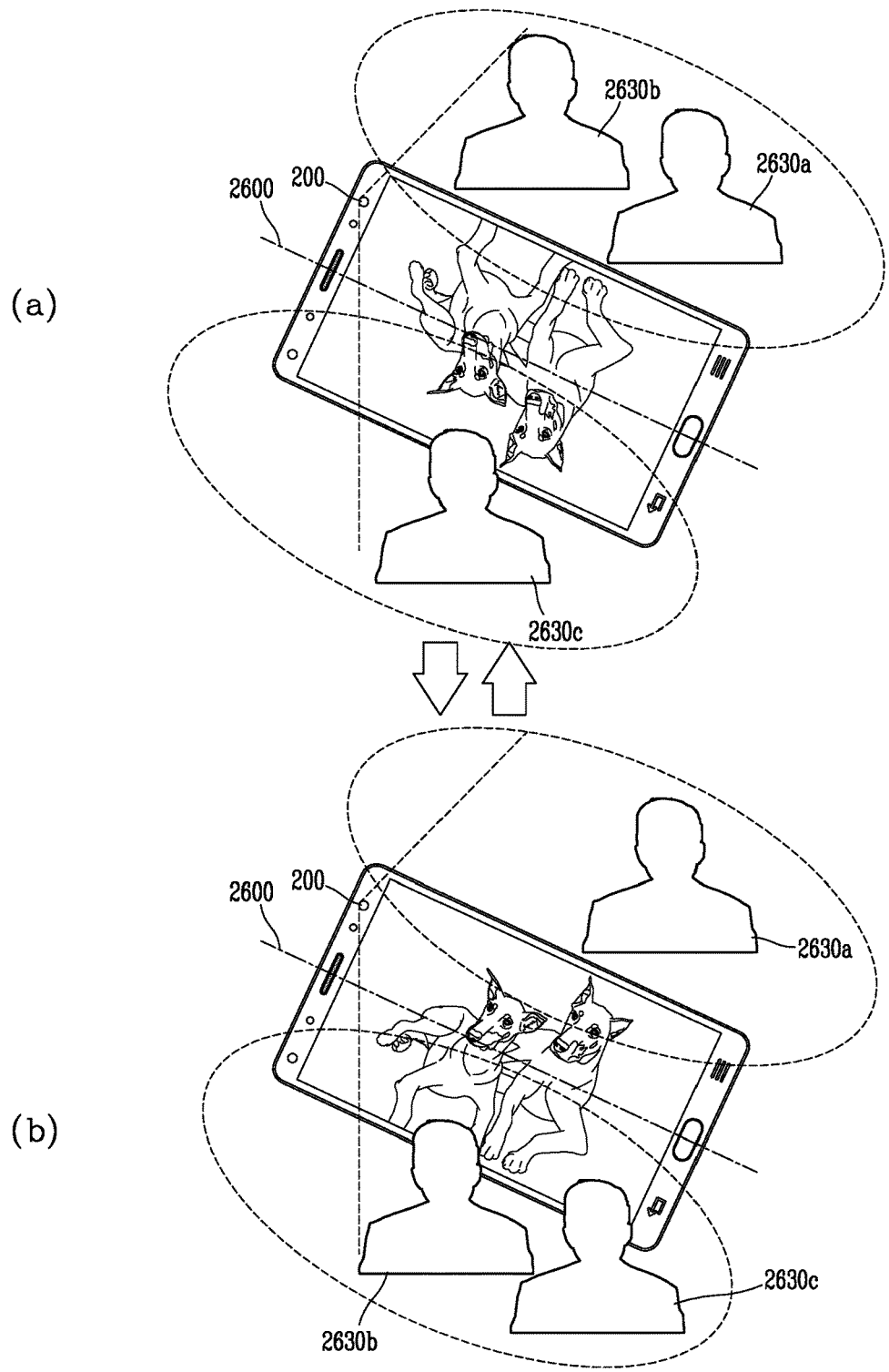

MOBILE TERMINAL AND METHOD FOR CONTROLLING THE SAME

CROSS-REFERENCE TO RELATED APPLICATION

Pursuant to 35 U.S.C. § 119(a), this application claims the benefit of an earlier filing date of and the right of priority to Korean Application No. 10-2016-0169766, filed on Dec. 13, 2016, the contents of which are incorporated by reference herein in its entirety.

BACKGROUND OF THE INVENTION

1. Field of the Invention

This specification relates to a mobile terminal capable of executing iris recognition and a method for controlling the same.

2. Background of the Invention

Terminals may be divided into mobile/portable terminals and stationary terminals. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

In recent years, as the functions of the mobile terminal have diversified, there is a need to enhance security of the mobile terminal. In order to enhance the security of the mobile terminal, biometrics-based authentication using a part of a human body as an authentication method is applied. As an example of such biometrics-based recognition, iris recognition is being applied to the mobile terminal.

SUMMARY OF THE INVENTION

Therefore, an aspect of the detailed description is to provide an arrangement structure capable of supplementing a field of view of an iris recognition sensor.

Another aspect of the detailed description is to improve convenience of a user who executes iris recognition.

Anther aspect of the detailed description is to provide a method for reducing power consumption using a low power image sensor.

To achieve these and other advantages and in accordance with the purpose of this specification, as embodied and broadly described herein, there is provided a mobile terminal, including a main body, a receiver disposed on an upper end portion of the main body, an infrared unit configured to output infrared ray toward a subject, located in a first direction based on the receiver, and disposed on the upper end portion of the main body at a first interval from the receiver, an iris recognition sensor configured to receive reflected ray that the infrared ray output from the infrared unit is reflected from the subject, located in a second direction opposite to the first direction based on the receiver, and disposed on the upper end portion of the main body with a first distance from the receiver, and a low power image sensor arranged on an area adjacent to the iris recognition sensor to have a focal point corresponding to that of the iris recognition sensor.

To achieve these and other advantages and in accordance with the purpose of this specification, as embodied and broadly described herein, there is provided a method for controlling a mobile terminal, the method including detecting a face image through a low power image sensor in an inactive state of a display unit in which an output of visual information on the display unit is restricted, and outputting specific information on one area of the display unit based on the face image detected through the low power image sensor. The outputting the specific information may be configured in a manner that the specific information disappears from the one area when the face image is not detected through the low power image sensor, and the display unit may be in the inactive state, irrespective of whether or not to output the specific information.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 16A and 16B are views illustrating embodiments related to a maintenance of a release state (unlock state);

FIG. 17 is a conceptual view illustrating an embodiment related to photographing (capturing) of a subject;

FIGS. 18A and 18B are views illustrating embodiments related to face recognition;

FIG. 19 is a view illustrating an embodiment related to a ringtone;

FIG. 20 is a view illustrating an embodiment related to security;

FIGS. 21A and 21B are views illustrating embodiments related to a watch-type terminal;

FIGS. 23 and 24 are views illustrating embodiments of deciding an output direction of screen information according to a face direction;

FIGS. 26A to 26C are views illustrating embodiments of deciding an output direction of a screen when a plurality of user faces are detected.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
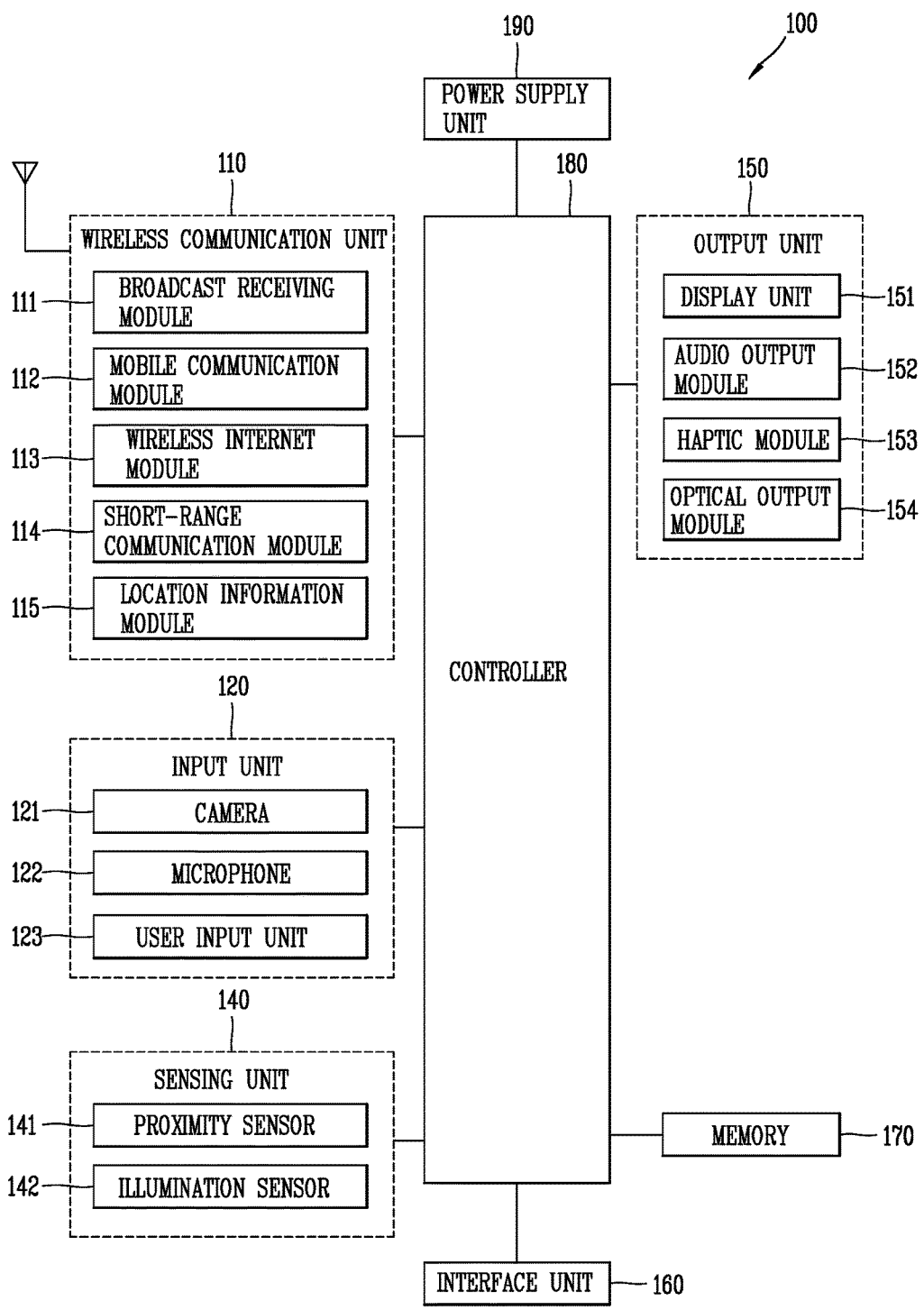
FIG. 1A is a block diagram of a mobile terminal according to an embodiment of the present invention.
Figure 1B:
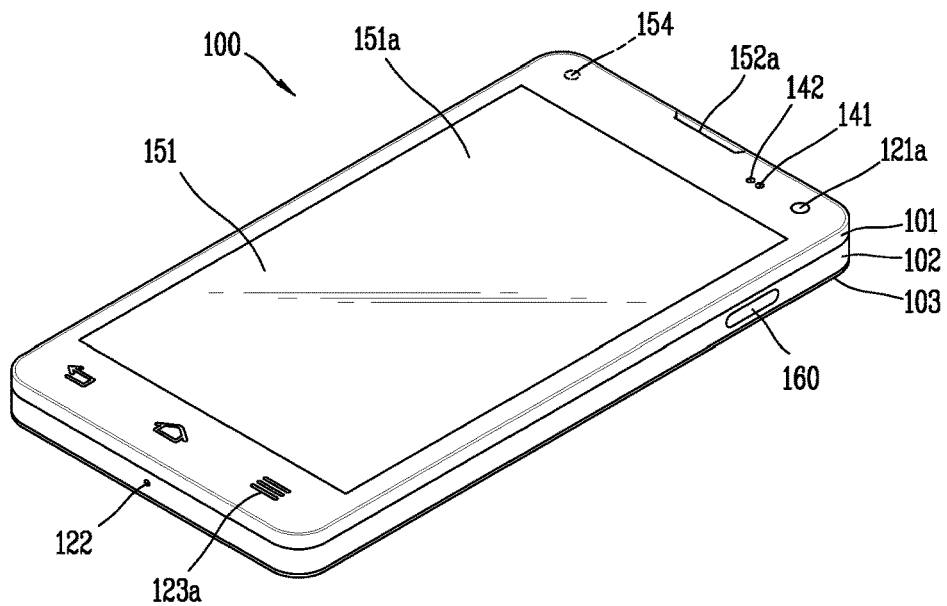
FIGS. 1B and 1C are conceptual views of one example of the mobile terminal, viewed from different directions.
Figure 1C:
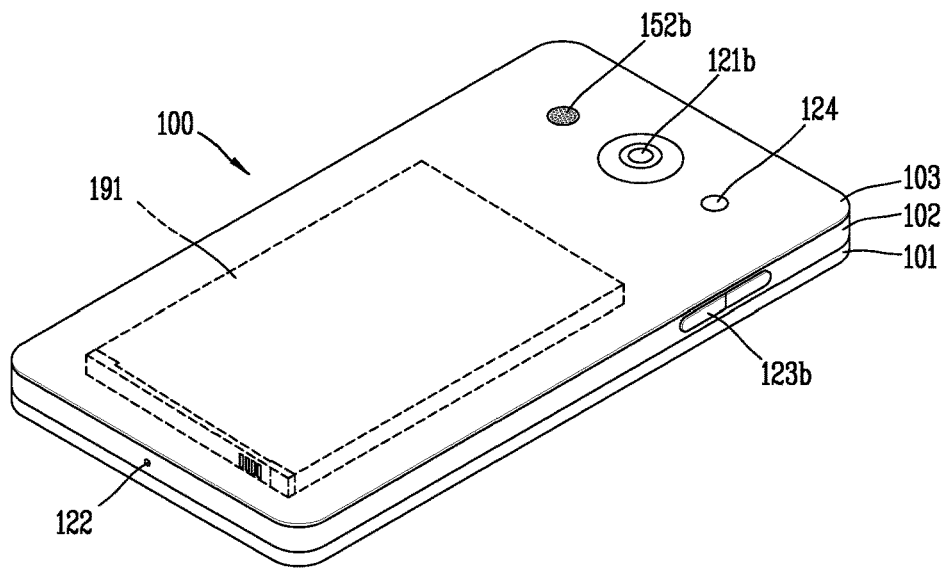

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 controls some or all of the components illustrated in FIG. 1A according to the execution of an application program that have been stored in the memory 170. In addition, the controller 180 can control at least two of those components included in the mobile terminal to activate the application program.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Wideband CDMA (WCDMA), High Speed Downlink Packet access (HSDPA), High Speed Uplink Packet Access (HSUPA), Long Term Evolution (LTE), LTE-advanced (LTE-A) and the like). Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LET-A, and the like, as part of a mobile communication network, the wireless Internet module 113 performs such wireless Internet access.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 may be configured to permit various types of inputs to the mobile terminal 120. Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operation of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor can sense a touch (or a touch input) applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller can process the received signals, and then transmit corresponding data to the controller 180. Accordingly, the controller 180 can sense which region of the display unit 151 has been touched. Here, the touch controller can be a component separate from the controller 180, the controller 180, and combinations thereof.

Meanwhile, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data can be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, In addition, the like). However, such teachings with regard to a particular type of mobile terminal will generally apply to other types of mobile terminals as well.

The mobile terminal 100 will generally include a case (for example, frame, housing, cover, In addition, the like) forming the appearance of the terminal. In this embodiment, the case is formed using a front case 101 and a rear case 102. Various electronic components are incorporated into a space formed between the front case 101 In addition, the rear case 102. At least one middle case may be additionally positioned between the front case 101 In addition, the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, In addition, the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a In addition, the front case 101, between the front case 101 In addition, the rear case 102, or between the rear case 102 In addition, the rear cover 103, to hermetically seal an inner space when those cases are coupled.

The mobile terminal 100 may be provided with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, In addition, the like.

FIGS. 1B and 1C depict certain components as arranged on the mobile terminal. However, alternative arrangements are possible and within the teachings of the instant disclosure. Some components may be omitted or rearranged. For example, the first manipulation unit 123a may be located on another surface of the terminal body, In addition, the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch In addition, the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, In addition, the like.

The window 151a of the display unit 151 will typically include an aperture to permit audio generated by the first audio output module 152a to pass. One alternative is to allow audio to be released along an assembly gap between the structural bodies (for example, a gap between the window 151a In addition, the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, In addition, the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170. The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, In addition, the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, In addition, the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds. The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, In addition, the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), In addition, the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) In addition, the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT. Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, In addition, the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, In addition, the like. In order to remove wireless APs provided using a mobile AP or an illegal MAC address during a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, In addition, the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs In addition, the mobile terminal. In order to measure the distance between the mobile terminal In addition, the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

Hereinafter, embodiments related to a control method that can be implemented in a mobile terminal configured as above will be described with reference to the accompanying drawings. It will be apparent to those skilled in the art that the present invention may be embodied in other specific forms without departing from the spirit or essential characteristics thereof.

The mobile terminal according to an embodiment of the present invention further includes a low power image sensor for sensing an object using low power. Hereinafter, a low power image sensor will be described with reference to FIG. 2. In particular, FIG. 2 is a block diagram illustrating components of the low power image sensor.

The mobile terminal according to an embodiment of the present invention includes a low power image sensor 200. The low power image sensor 200 is a low-power CMOS sensor, and can detect an object located within a predetermined area based on a black-and-white image sensor. This sensor may also be referred to as a glance sensor.

The low power image sensor 200 can be always in an active state as long as power is supplied to the mobile terminal. The active state refers to a state of detecting an object located within a predetermined area based on a black-and-white image sensor of the low power image sensor 200.

Figure 2:
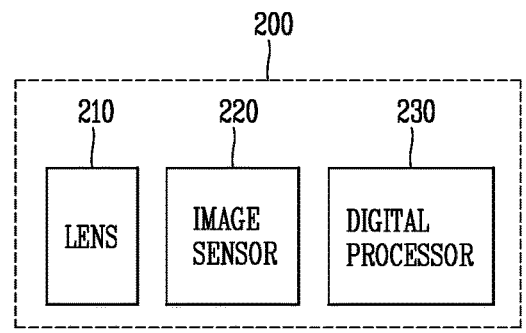
FIG. 2 is a block diagram illustrating a low power image sensor provided in a mobile terminal according to an embodiment of the present invention.

Referring to FIG. 2, the low power image sensor (i.e., glance sensor) 200 can include a lens 210, a low power image sensor 220 and a digital processor 230. A range of a field of view (FOV) of the lens 210 may be wider than a range of an FOV of a front camera lens. For example, the range of the FOV of the lens 210 may be 120 degrees, and the range of the FOV of the front camera may be 82 degrees. Thus, the low power image sensor can capture an image of a subject (object) that is located in a wider range than the front camera.

The image sensor 220 can sense a black-and-white image of a subject to be captured (photographed). For example, the image sensor 220 can sense black-and-white images at QVGA (resolution 320×240). Therefore, the image sensor 220 consumes less power than the front camera using a color sensor.

In addition, the digital processor 230 can detect an outline or shape of the subject included in the image based on the black-and-white image sensed by the image sensor 220, and execute face detection, eye detection, gesture detection, gaze detection and the like based on the detected outline or shape. The face detection is a process for detecting whether or not the subject captured in the black-and-white image is a face image, and the eye detection is a process for detecting whether or not the subject captured in the black-and-white image is an eye image. In addition, the gesture detection is a process for detecting a gesture of the subject captured in the black-and-white image. The gaze detection is a process for detecting a gaze direction based on the black-and-white image.

For example, the digital processor 230 can analyze the black-and-white image received from the image sensor 220 based on a preset algorithm, and determine based on the analysis result whether the subject captured in the black-and-white image is a user's face or the user's finger. Since the digital processor 230 receives a low-resolution black-and-white image from the image sensor 220, it is possible to determine the outline or shape of the subject, but difficult to determine a function requiring for a high-resolution image such as face recognition.

The digital processor 230 can perform an overall control of an operation of the low power image sensor 200 through communication with a main processor (i.e., the controller 180) of the mobile terminal. Specifically, the digital processor 230 can receive a control command or a control signal from the main processor and control the operation of the low power image sensor 200 using the lens 210 and the image sensor 220 based on the received control command or control signal. The digital processor 230 can transmit the result of the operation of the low power image sensor 200 to the main processor. For example, the digital processor 230 can transmit result information from the face detection, the eye detection, the gesture detection and the like to the main processor.

The low power image sensor can detect adjacent objects by using lower power than the existing proximity sensor which detects the proximity of an adjacent object using light or a magnetic field. Therefore, the lower power image sensor can be utilized as a substitute for the existing proximity sensor.

Further, the digital processor 230 may further include a memory for storing a low-power CPU, algorithm information, and the like, and hardware blocks. Also, the low power image sensor may be provided with or not provided with components, such as a power supply unit and the like, required for operating the low power image sensor, in addition to the aforementioned components.

Figure 3A:
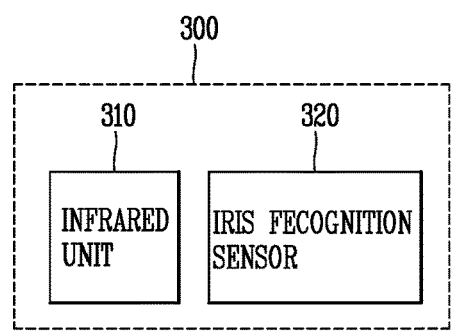
FIGS. 3A and 3B are views illustrating an iris recognition unit provided in a mobile terminal according to an embodiment of the present invention.
Figure 3B:
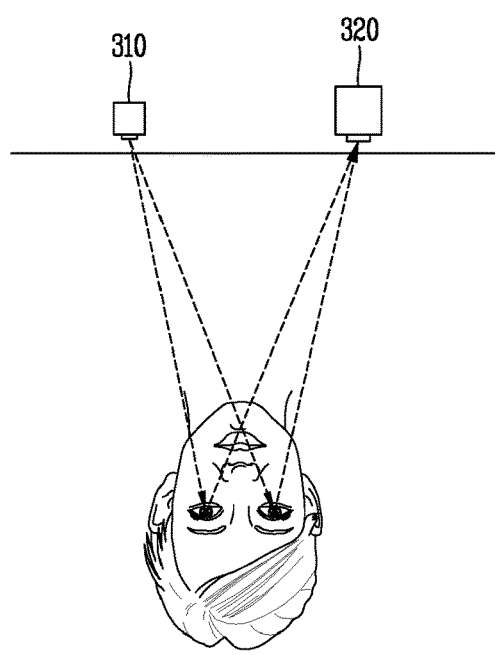

The mobile terminal disclosed herein includes an iris recognition unit for recognizing a user's iris. In particular, FIGS. 3A and 3B are views illustrating an iris recognition unit provided in the mobile terminal according to an embodiment of the present invention.

The iris recognition refers to a technology of identifying a user by using an iris pattern that is maintained uniquely for each person. More specifically, the user's iris means a donut-shaped film surrounding a black pupil located at a center of the pupil of a person. This iris plays a role of controlling a size of the pupil while contracting and relaxing according to an amount of light coming from the outside. Further, a pupillary sphincter which is responsible for the contraction and relaxation of the iris forms a complex pattern, and the iris recognition can be performed using this pattern. That is, the iris recognition is a technology for identifying the user by analyzing shape and color of the iris, morpheme of a retinal capillary and the like.

In order to execute the iris recognition, the mobile terminal can include an iris recognition unit 300. For example, referring to FIG. 3A, the iris recognition unit 300 can include an infrared unit 310 and an iris recognition sensor 320. The infrared unit 310 can output infrared rays. For example, an infrared LED (light emit diode) may be included in the infrared unit 310. As illustrated in FIG. 3B, red near-infrared rays can be output from the infrared LED. The infrared rays can reach the user's iris and be reflected from the user's iris.

The infrared unit 310 can output the infrared rays in response to a user request being received. For example, the infrared unit 310 can output the infrared rays in response to a reception of a user request to perform the iris recognition.

As illustrated in FIG. 3B, the iris recognition sensor 320 can capture an iris image in which the infrared rays reaches the user's iris. As an example of the iris recognition sensor 320, a near infrared camera may be used.

As a viewing angle increases, the iris recognition sensor 320 may become thicker. For example, the thickness of the iris recognition sensor 320 is 5.65 mm when the viewing angle of the iris recognition sensor is 35 degrees, while the thickness of the iris recognition sensor module is 4.55 mm when the viewing angle of the iris recognition sensor 320 is 14.5 degrees. Thus, the iris recognition sensor may have a viewing angle of 14.5 degrees so as not to affect the thickness of the mobile terminal.

In addition, the iris recognition sensor 320 may have a narrower viewing angle than the front camera 121a of the mobile terminal. For example, the iris recognition sensor 320 may have the viewing angle of 14.5 degrees and the front camera 121*a* may have a viewing angle of 82 degrees. That is, due to the narrow viewing angle of the iris recognition sensor 320, the user needs to appropriately adjust a position (location) between the mobile terminal and the user for the iris recognition. In addition, it is preferable that the iris recognition sensor is located at a center of the mobile terminal for the user's convenience to perform the iris recognition.

In addition, the iris recognition unit may further include a digital processor to perform the iris recognition based on an iris image sensed by the iris recognition sensor 320. More specifically, the digital processor can extract data associated with the iris from the iris image based on a preset algorithm, and analyze a pattern of the iris for each area based on the extracted data associated with the iris. The preset algorithm includes the related art technique used for performing the iris recognition, and a detailed description thereof will be omitted herein.

Further, the digital processor can generate a unique iris code of the user based on the analysis result of the iris image, and store the generated iris code in the memory. The digital processor can identify the user by comparing the iris code stored in the memory with the iris data of the iris image recognized by the iris recognition sensor 320 during the iris recognition. In addition, the digital processor may also be separately provided in the iris recognition unit, but may be replaced with the controller 180 of the mobile terminal. Hereinafter, it is assumed for the sake of explanation that the controller 180 of the mobile terminal performs such iris recognition. However, the present invention is not limited to this. The present invention may equally be applied even when the iris recognition is performed by the digital processor provided in the iris recognition unit itself.

The iris recognition unit for performing the iris recognition has been described above. Hereinafter, a mechanism structure for performing the iris recognition will be described. In particular, FIG. 4 is a layout diagram illustrating a mechanism structure for executing iris recognition in a mobile terminal according to an embodiment of the present invention, and FIG. 5 is a view illustrating focal points of an iris recognition sensor and a low power image sensor.

The mobile terminal according to an embodiment of the present invention may include the infrared unit (an IR portion) 310 and the iris recognition sensor 320 for detecting an iris, and the low power image sensor 200 for sensing an adjacent object.

Figure 4:
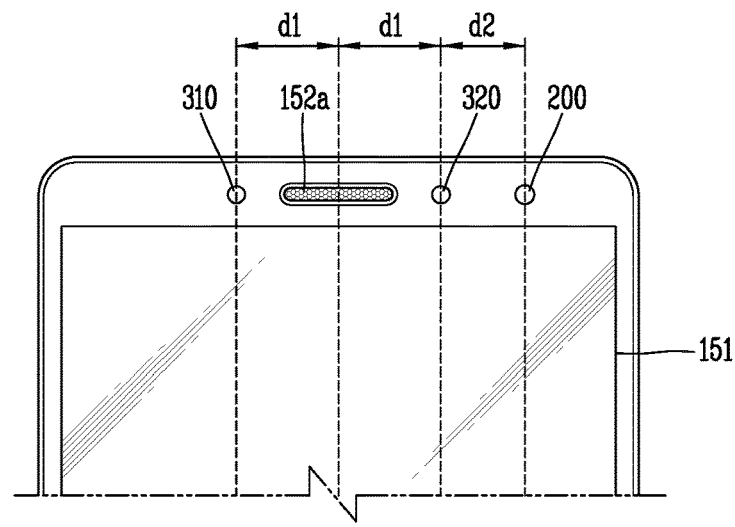
FIG. 4 is a layout diagram illustrating a mechanism structure for executing iris recognition in a mobile terminal according to an embodiment of the present invention.
Figure 5:
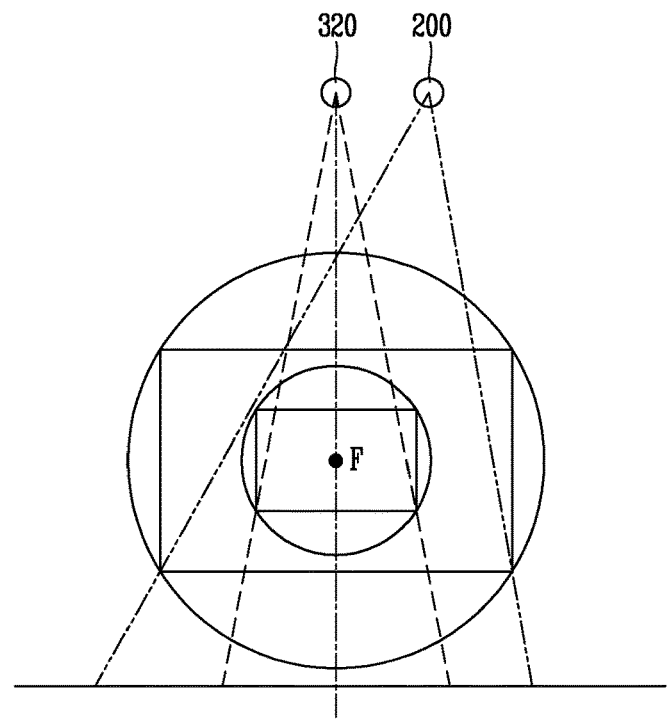
FIG. 5 is a view illustrating focal points of an iris recognition sensor and a low power image sensor.

FIG. 4 illustrates the infrared unit 310, the iris recognition sensor 320, and the low power image sensor 200 disposed on an upper end portion of a front surface of the mobile terminal. First, a receiver 152*a* for outputting a sound can be disposed on the front upper end portion of the present invention. The receiver 152*a* can be disposed on the center of the upper end portion for user convenience. Accordingly, when the user places a call using the mobile terminal, the user can receive a call sound in any direction if only the main body is put to an ear.

Since the viewing angle of the iris recognition sensor 320 is narrow, the iris recognition sensor 320 is preferably disposed on a central area of the front upper end portion, in order to capture a user's front face located at the front surface of the main body. In addition, the infrared unit 310 can be disposed on the central area of the front upper end portion of the main body, if possible, so as to output infrared ray to the iris of the user.

For example, referring to FIG. 4, the infrared unit 310 and the iris recognition sensor 320 can be disposed in opposite directions with the receiver 152*a* interposed therebetween. For example, when viewed from the front of the main body, the infrared unit 310 can be disposed on a left side with respect to the receiver 152*a* and the iris recognition sensor 320 can be disposed on a right side with respect to the receiver 152*a*. On the contrary, when viewed from the front of the main body, the infrared unit 310 can be disposed on the right side with respect to the receiver 152*a* and the iris recognition sensor 320 can be disposed on the left side with respect to the receiver 152*a*. The positions of the infrared unit 310 and the iris recognition sensor 320 may be changed by a design of a designer.

The infrared unit 310 and the iris recognition sensor 320 can be disposed on the upper end portion of the front surface so as to have the same first distance d1 from the receiver 152*a*. The first distance d1 may be a distance at which the infrared ray output from the infrared unit 310 is best received within the viewing angle of the iris recognition sensor 320. For example, the first distance d1 may be in the range of 5 mm to 8 mm. Accordingly, the present invention enables the user performing the iris recognition to perform a relative position movement from the mobile terminal at a minimum.

In addition, the low power image sensor 200 can be disposed as far as possible from the infrared unit 310 in order to limit the influence of the infrared ray output from the infrared unit 310. That is, the low power image sensor 200 can be arranged so that the infrared ray output from the infrared unit 310 does not reach the low power image sensor 200. For example, as illustrated in FIG. 4, the low power image sensor 200 can be disposed in a direction opposite to the infrared unit 310 with respect to the receiver 152*a*. Accordingly, the low power image sensor 200 can be disposed at an area adjacent to the iris recognition sensor 320.

Also, the low power image sensor 200 can be arranged such that its focal point matches a focal point of the iris recognition sensor 320 in order to improve the user's convenience. Thus, the low power image sensor 200 can be disposed at a second distance d2 from the iris recognition sensor 320.

The second distance d2 may be decided by the viewing angles of the low power image sensor 200 and the iris recognition sensor 320. The second distance d2 may be shorter than the first distance d1. More specifically, the second distance d2 may be an interval of 3 mm to 5 mm. For example, as illustrated in FIG. 5, when the viewing angle of the low power image sensor 200 is 120 degrees and the viewing angle of the iris recognition sensor 320 is 14.5 degrees, the low power image sensor 200 and the iris recognition sensor 320 can be spaced apart from each other by an interval of 3 mm.

In addition, as illustrated in FIG. 5, since the low power image sensor 200 has a wide viewing angle, the low power image sensor 200 can sense an object located at the front of the main body even if it is not disposed on the central area of the main body. Accordingly, the low power image sensor 200 can serve as an alternative component of the proximity sensor.

The arrangement structure of the iris recognition sensor and the low power image sensor in the mobile terminal according to an embodiment of the present invention has been described above. Hereinafter, an arrangement structure of the front camera and the low power image sensor in the mobile terminal according to an embodiment of the present invention will be described. In particular, FIGS. 6 and 7 are views illustrating the mechanism arrangement structure between the front camera and the low power image sensor.

Figure 6:
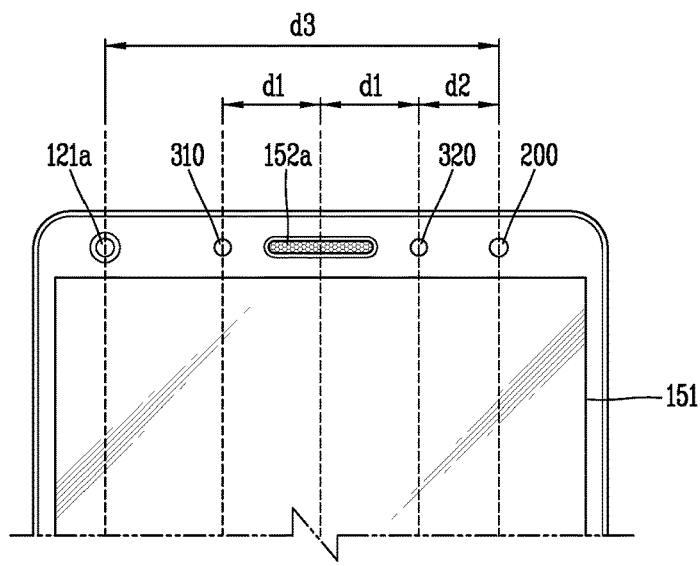
FIGS. 6 and 7 are views illustrating a mechanism arrangement structure between a front camera and a low power image sensor.
Figure 7:
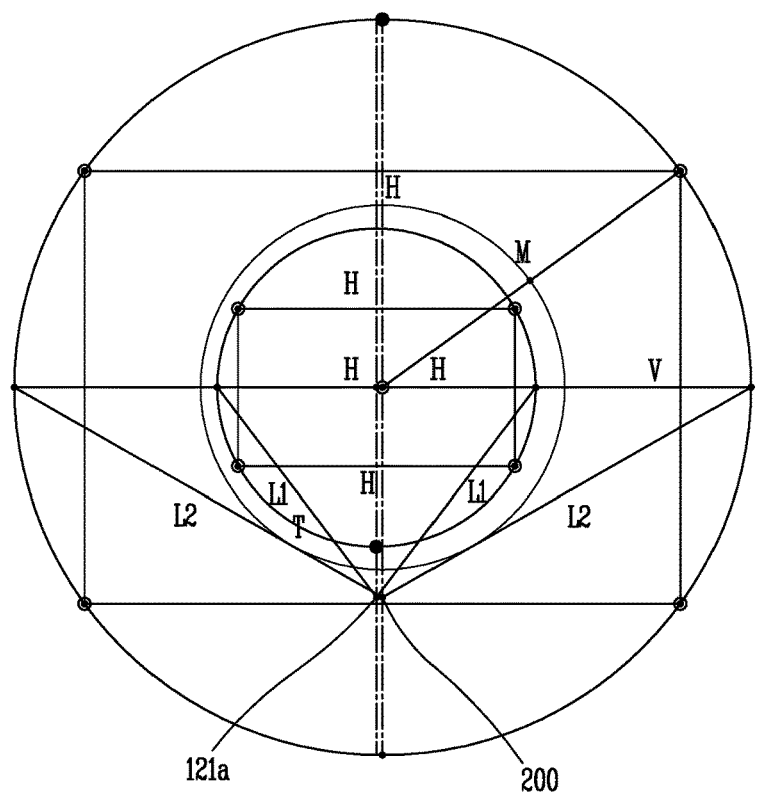

As illustrated in FIG. 6, on the front surface of the mobile terminal according to an embodiment of the present invention may include the front camera 121a, the infrared unit 310, the receiver 152a, the iris recognition sensor 320 and the low power image sensor 200 sequentially from the left side. In addition, the description of the arrangement of the infrared unit 310, the receiver 152a, the iris recognition sensor 320 and the low power image sensor 200 can be replaced with the description of FIG. 4.

Further, the front camera 121a can capture an object located in front of the main body. For example, the front camera 121a can be used to capture a user's face image located in front of the main body. Also, the front camera 121a can capture images in the same manner as the low power image sensor 200. However, as shown in the following table, the low power image sensor 200 can play a different role in various aspects.

In particular, the table below compares the specifications of the low power image sensor and the front camera.

|  | Low power image sensor | Front camera |
| --- | --- | --- |
| Module size | 3.6 × 4.0 × 2.5 mm | 7.3 × 6.7 × 4.5 mm |
| Consumed current | 0.3 mA | 110 mA |
| FOV | 120° | 82° |
| resolution | QVGA (320 × 240) | 5M/8M |
| Output format | Meta data | Bayer data (RGB) |

The table illustrates the low power image sensor 200 has a smaller module size than the front camera 121a and consumes less current. Also, it can be seen that the resolution of the low power image sensor 200 is lower than that of the front camera. Accordingly, it is possible to detect a shape or outline of a subject from an image captured through the low power image sensor 200, but it is difficult to identify a subject, such as face recognition Further, since the low power image sensor 200 has the FOV larger than that of the front camera 121a, the low power image sensor 200 can capture the subject of a wider area at the same position. In this instance, in order to improve the user's convenience, the mobile terminal according to an embodiment of the present invention can have the front camera 121a arranged so that focal points of the low power image sensor 200 and the front camera 121a can coincide with each other. More specifically, as illustrated in FIG. 6, the front camera 121a can be disposed to have a third distance d3 from the low power image sensor 200. The third distance d3 can be decided by the focal points of the low power image sensor 200 and the front camera 121a.

For example, as illustrated in FIG. 7, the front camera 121a can be arranged to have a distance of 20 mm from the low power image sensor 200 when the FOV of the front camera is 82 degrees and the FOV of the low power image sensor 200 is 120 degrees. In another example, when the FOV of the front camera is 75 degrees and the FOV of the low power image sensor 200 is 120 degrees, the front camera 121a can be arranged at a distance of 19 mm from the low power image sensor 200.

Accordingly, the front camera 121a can be located in a direction opposite to the low power image sensor 200 based on the receiver 152a. For example, when the low power image sensor 200 is located on a right side of the receiver 152a, the front camera 121a can be located on a left side of the receiver 152a. That is, the front camera 121a can be located in the same direction as the infrared unit 310 based on the receiver 152a.

Also, the front camera 121a can be arranged to have a distance of 2 mm to 3 mm from the infrared unit 310. Accordingly, the present invention improves user convenience by maintaining the structure described in FIG. 4 and simultaneously coinciding the focal points of the front camera and the low power image sensor with each other.

Figure 8:
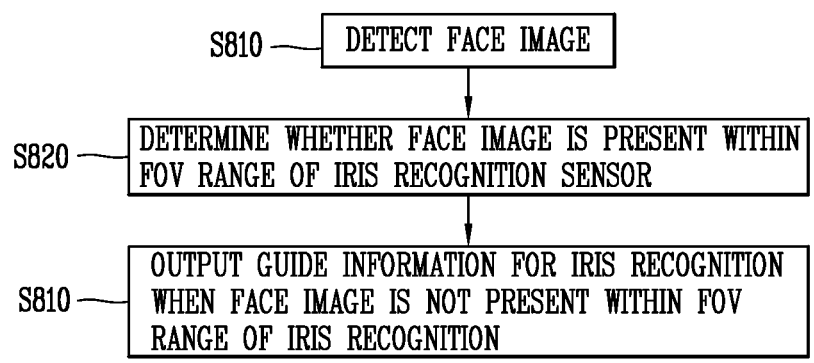
FIG. 8 is a flowchart illustrating a method of executing iris recognition.
Figure 9:
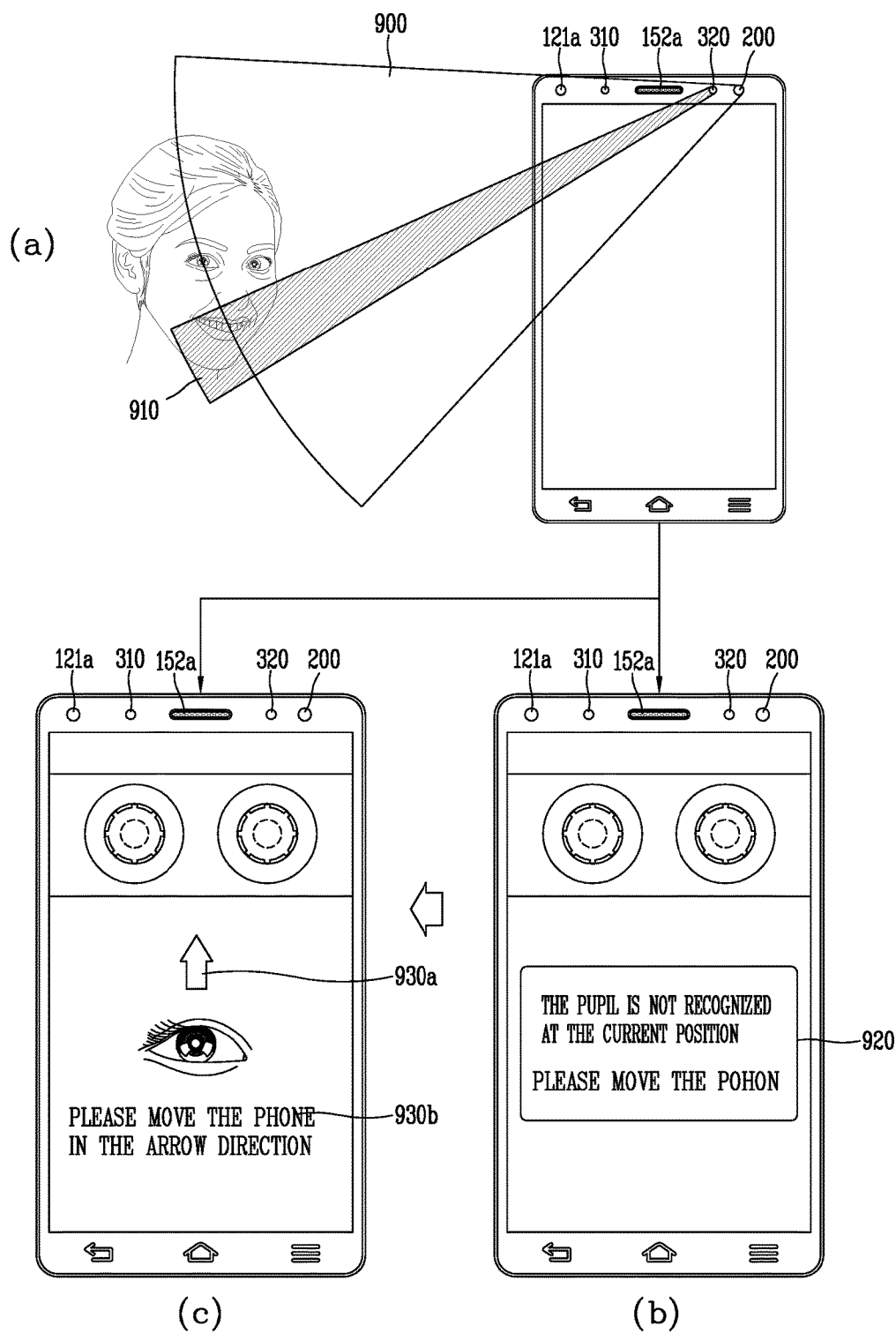
FIGS. 9 and 10 are conceptual views related to FIG. 8.
Figure 10:
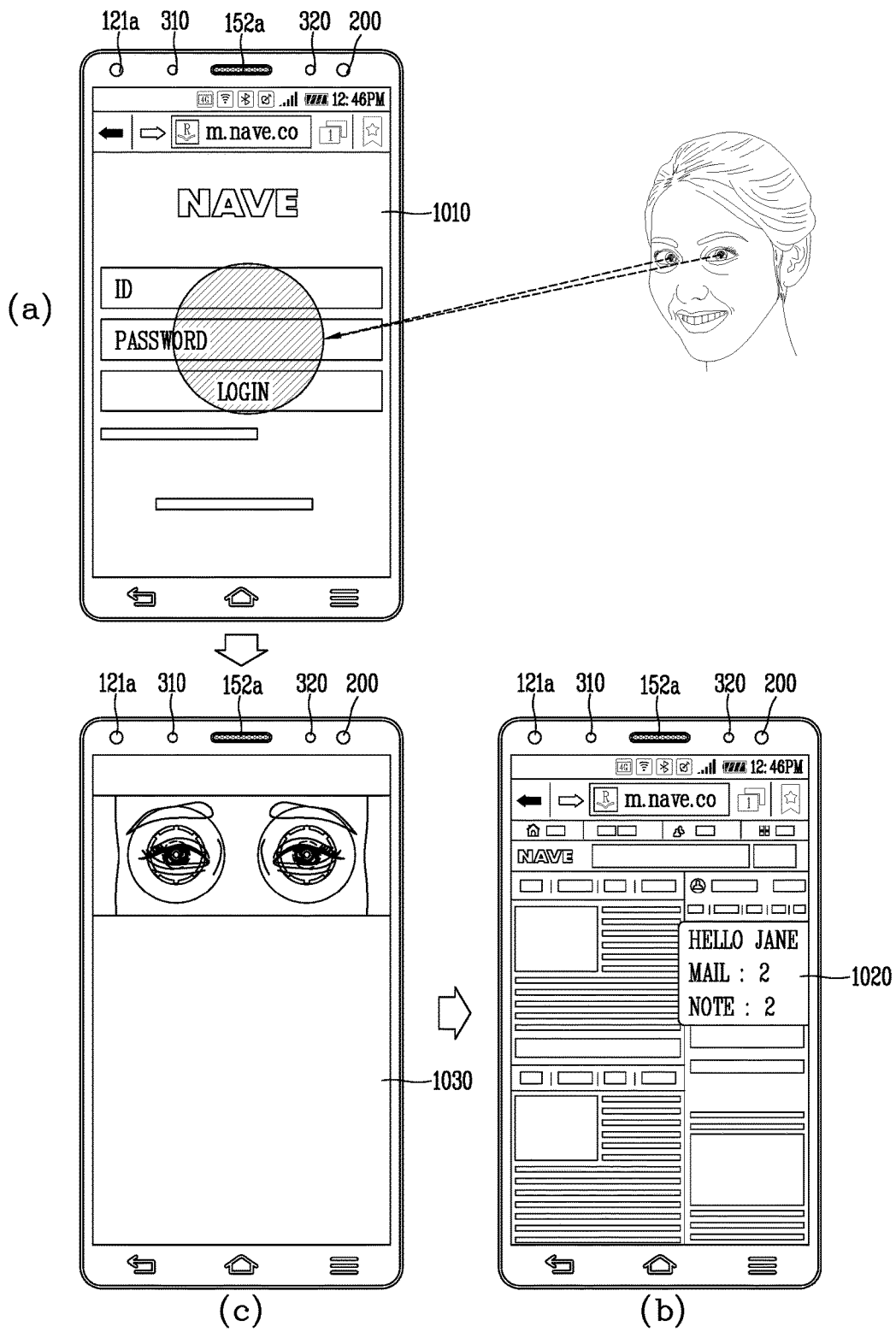

Hereinafter, a control method using the difference of the FOV between the iris recognition sensor and the low power image sensor will be described. In particular, FIG. 8 is a flowchart illustrating a method of performing iris recognition, and FIGS. 9 and 10 are conceptual views related to FIG. 8.

The controller 180 of the mobile terminal according to an embodiment of the present invention can perform the iris recognition using the iris recognition unit 300. The description of the method of performing the iris recognition is made above in FIGS. 3A and 3B.

In addition, for the related art iris recognition, the user moves the mobile terminal to a position where the iris recognition is executable. However, in the related art, the user is not informed about the position for performing the iris recognition.

Therefore, in an embodiment of the present invention, a method for performing iris recognition more conveniently by a user attempting the iris recognition will be described. Referring to FIG. 8, when an iris recognition function is executed, the controller 180 can detect a face image by the low power image sensor 200 (S810).

Further, the controller 180 can execute the iris recognition function based on a user request. For example, the controller 180 can execute the iris recognition function based on a reception of a user request for releasing a lock state. As another example, the controller 180 can execute the iris recognition function based on the reception of the user request for executing the iris recognition function.

Alternatively, the controller 180 can execute the iris recognition function when a preset condition is satisfied. The preset condition may be involved to at least one of a user's gaze and screen information output on the display unit 151. For example, the controller 180 can execute the iris recognition function when the user's gaze detected through the low power image sensor is directed to screen information (for example, login screen information) requiring for authentication. As another example, when a function, such as a mobile payment, requiring for iris authentication is executed, the controller 180 can execute the iris recognition function.

When the iris recognition function is executed, the controller 180 can output an execution screen of the iris recognition function on the display unit 151. The execution screen of the iris recognition function may include a graphic object for guiding positions of the eyes of the user.

In addition, when the iris recognition function is executed, the controller 180 can determine a position of the user's face through the low power image sensor 200. More specifically, the controller 180 can detect the user's face image through the low power image sensor 200. The controller 180 can also analyze the detected face image based on a preset algorithm, and determine the position of the user's face based on the analysis result.

Afterwards, the controller 180 can determine whether the face image is present within an FOV range of the iris recognition sensor (S820). In addition, the controller 180 can determine whether the user's face is located in a virtual space based on the analysis result of the face image. The virtual space may be a space corresponding to the FOV range of the iris recognition sensor. The controller 180 can then compare the determined face position with the virtual space, and determine whether the user's face is within the FOV range of the iris recognition sensor based on the comparison result.

For example, as illustrated in (a) of FIG. 9, when the user's face is not located in a virtual space 900, the controller 180 can determine that the user's face is not located within the FOV range of the iris recognition sensor. When the user's face is not present within the FOV range of the iris recognition sensor, the controller 180 can output guide information for the iris recognition (S830).

When the user's face is not within the FOV range of the iris recognition sensor and the iris recognition cannot be performed accordingly, the controller 180 can output the guide information so that the user can recognize that the iris recognition sensor cannot be executed.

The guide information can be output in at least one of visual, auditory, and tactile manners. For example, the guide information can be visually displayed on the display unit 151 or can be output as LED light using an optical output unit. Alternatively, the guide information can be audibly output through a speaker or be tactually output such as vibration of the main body. Furthermore, the guide information can be output by combination of at least two of these manners. Also, the guide information can be output on the execution screen of the iris recognition function in an overlapping manner.

In addition, the guide information may include notification information indicating that the iris recognition cannot be executed, and guide information for guiding the position of the user's face. For example, as illustrated in (b) of FIG. 9, when the user's face is not located within the FOV range of the iris recognition sensor, guide information 920 "The pupil is not recognized at the current position. Please move the phone" can be output.

The controller 180 can also output guide information indicating a direction to move the mobile terminal based on the position of the user's face, in order to execute the iris recognition. For example, as illustrated in (c) of FIG. 9, when the user's face is located above the FOV range of the iris recognition sensor, the controller 180 can display guide information 930b "Please move the terminal along the arrow" together with an arrow 930a directing to a top. Therefore, the present invention can improve the user's convenience by moving the terminal while checking correct direction and position to move the terminal based on the guide information.

In addition, when the iris recognition is executed, the guide information may disappear along with the execution screen of the iris recognition function. In addition, the guide information can be changed in real time according to the position of the user's face. For example, when the position of the user's face is changed from above to below the FOV range of the iris recognition sensor, the controller 180 can output the guide information by changing an arrow directed to a top to an arrow directed to a bottom, included in the guide information.

When the user's face is within the FOV range of the iris recognition sensor, the controller 180 can control the iris recognition sensor 320 to detect the face image even if the face image is not detected through the low power image sensor 200, and immediately execute the iris recognition based on the detected face image. In this instance, the iris recognition may be executed in the same manner as the related art iris recognition function.

In addition, the controller 180 can further detect information related to the user's gaze by using the low power image sensor 200. For example, the controller 180 can extract gaze information from the face image and determine the gaze direction based on the extracted gaze information.

The controller 180 can execute the iris recognition function based on the gaze information. More specifically, when screen information requiring for authentication is output on the display unit 151, and when it is determined that the user's gaze is directed to the screen information requiring for the authentication, the controller 180 can execute the iris recognition function. Here, the screen information requiring for the authentication may be screen information requiring for password information, such as login screen information including a window for inputting an ID and a password to log in a specific website, screen information for inputting a password during a payment, and the like.

For example, as illustrated in (a) of FIG. 10, when the login screen information 1010 is output on the display unit 151, and when it is determined that the user's gaze is directed to the login screen information 1010, the controller 180 can execute the iris recognition function. In addition, the foregoing description has been given of the example where the gaze is directed to the screen information requiring for the authentication. However, the iris recognition function can be executed immediately when the screen information requiring for the authentication is output.

When the iris recognition function is executed, the controller 180 can output an iris recognition screen on the screen information requiring for the authentication in an overlapping manner. Alternatively, as illustrated in (b) of FIG. 10, only an iris recognition screen 1030 can be output on the display unit 151.

As described above, the controller 180 can determine the face position through the low power image sensor and output the guide information related to the iris recognition accordingly. The controller 180 can also immediately execute the iris recognition through the iris recognition sensor.

The controller 180 can complete the iris recognition when a prestored iris code matches a detected iris image. For example, as illustrated in (c) of FIG. 10, the controller 180 can complete a log-in to a specific website and output login-completed screen information 1020 on the display unit 151.

Figure 11:
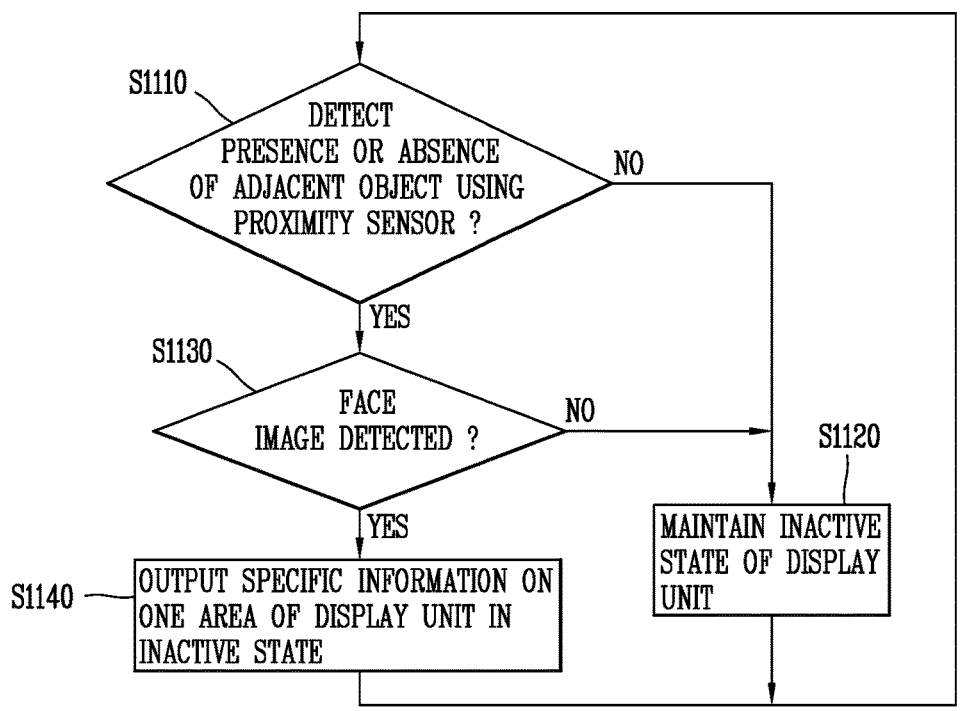
FIGS. 11 to 13 are views illustrating embodiments related to an always-on display.
Figure 12:
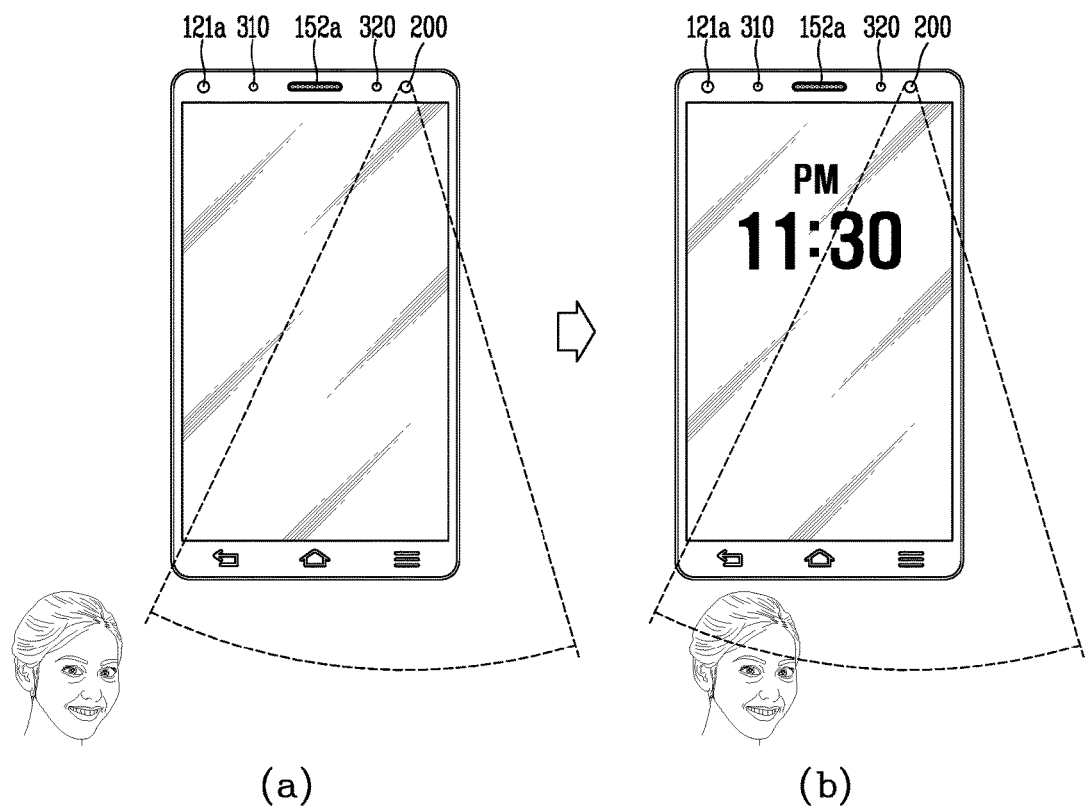
Figure 13:
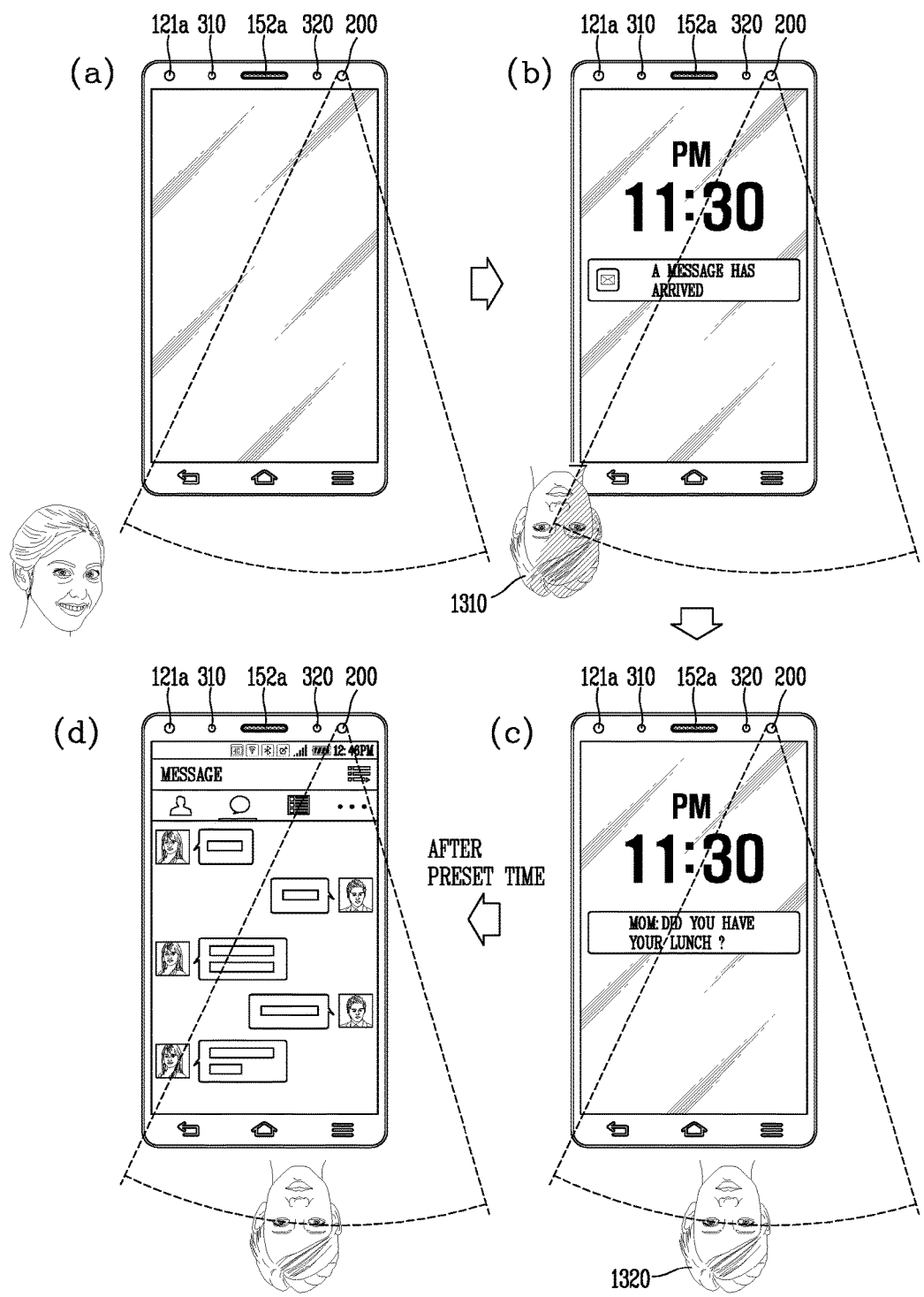

So far, the method for improving the user convenience in relation to the iris recognition using the low power image sensor has been described. Hereinafter, a method of reducing power consumption by utilizing a low power image sensor will be described. In particular, FIGS. 11 to 13 are views illustrating embodiments related to an always-on display.

The display unit 151 of the mobile terminal according to an embodiment of the present invention can output specific information on one area thereof when it is switched from an active state of allowing an output of visual information to an inactive state of restricting the output of the visual information.

Here, the active state of the display unit refers to when visual information is output by turning on a lighting device, and the inactive state of the display unit refers to when visual information is not displayed due to the lighting device being turned off.

In addition, the controller 180 can control the display unit to output specific information only in a partial area thereof in the inactive state of the display unit. The specific information is information that the user frequently checks, and may be general information such as time information and date information. Also, the specific information may include notification information indicating an event (e.g., a message reception event, a call signal reception event, etc.) generated in the mobile terminal. The display unit 151 capable of displaying specific information even in the inactive state thereof may be referred to as an always-on display.

The always-on display unit can output specific information in various ways. For example, the always-on display unit can output the specific information by selectively activating only a part of an active matrix OLED (AMOLED) constituting the display unit. As another example, the always-on display unit can output a black image in an entire output area thereof and display specific information in a part thereof.

Further, the specific information can be output on the display unit in the inactive state based on a preset condition. The preset condition may be a condition that no object exists adjacent to the display unit. That is, the always-on display unit in the inactive state may not output the specific information when an object is present adjacent to the display unit, while outputting he specific information when there is no object adjacent to the display unit.

Hereinafter, it is assumed that the display unit 151 is the always-on display unless otherwise specified. Referring to FIG. 11, in the inactive state of the display unit 151, the proximity sensor 141 can determine whether there is an object adjacent to the front surface of the main body (S1110).

The mobile terminal according to an embodiment of the present invention can detect whether or not an object exists adjacent to the display unit through the proximity sensor and the low power image sensor. In more detail, the proximity sensor is disposed on the front surface to detect whether an object exists in a surrounding area of the front surface of the main body. Such a proximity sensor may be an infrared sensor. The object detection method of the proximity sensor can be understood by the description of FIG. 1A. In addition, the low power image sensor 200 can capture the surrounding of the display unit, and determine the presence of an object and a type of the object at the surrounding of the display unit based on the captured image.

In addition, when an object is not detected through the proximity sensor, the display unit 151 can be maintained in the active state (S1120). Further, when an object is detected through the proximity sensor, the low power image sensor 200 can detect whether the detected object is a face (S1130).

The low power image sensor 200 can analyze an image of the detected object based on a preset algorithm, and determine whether the detected image is a face image based on the analysis result. If the object is a face, the controller 180 can set specific information to be output on the display unit 151 which is in the inactive state (S1140). Further, if the object is not a face, the display unit 151 can be maintained in the inactive state (S1120).

For example, referring to (a) of FIG. 12, a face image may not be detected by the low power image sensor 200 when the display unit 151 is in the inactive state and an object is not detected by the proximity sensor. In this instance, specific information is not output on the display unit 151, which is in the inactive state, even though any object is not detected by the proximity sensor.

Conversely, referring to (b) of FIG. 12, when the display unit 151 is in the inactive state and an object is not detected by the proximity sensor, the low power image sensor 200 can detect the face image. In this instance, the display unit 151 in the inactive state can output specific information on one area thereof. When a face image is not detected or an adjacent object is detected while specific information is output on the display unit in the inactive state, the controller 180 can control the display unit 151 not to output the specific information again.

The controller 180 of the mobile terminal according to an embodiment of the present invention may not output specific information on the display unit unless a face image is detected even if an object is not detected through the proximity sensor. Therefore, the present invention can prevent power consumption due to the output of the specific information even at an unnecessary time point, by selectively outputting the specific information in the inactive display unit only when the specific information is needed to be provided to the user.

In the foregoing description, when the proximity sensor is present has been described, but the proximity sensor may not exist in the present invention. In this instance, the controller 180 can decide whether or not to output specific information on the display unit 151 in the inactive state by only determining whether a face image is detected through the low power image sensor 200.

The method of displaying specific information on the display unit in the inactive state has been described above. Hereinafter, an embodiment of changing a degree of outputting specific information based on a face image will be described. In particular, FIG. 13 is a conceptual view illustrating an embodiment of changing a degree of outputting specific information.

When an event is generated in the mobile terminal, the controller 180 can output notification information notifying the generation of the event on the display unit 151. Further, when the event is generated in the inactive state of the display unit 151, the controller 180 can not output the notification information immediately.

In this instance, the controller 180 can determine whether a face image is detected by the low power image sensor 200 in the inactive state of the display unit 151. When the face image is detected, the controller 180 can output the notification information. For example, as illustrated in (a) of FIG. 13, the controller 180 can receive a message in the inactive state of the display unit. Further, the controller 180 can not output notification information on the display unit 151. As illustrated in (b) of FIG. 13, when the face image is detected by the low power image sensor, the controller 180 can output the notification information informing the reception of the message.

Also, the controller 180 can control a degree of outputting the notification information based on a shape of the face image detected by the low power image sensor 200. The shape of the face image is a front face, a side face (a right side face or a left side face), and the like.

For example, as illustrated in (b) of FIG. 13, the face image detected by the low power image sensor 200 can correspond to a side face 1310. In this instance, the controller 180 can output the notification information indicating a reception of a message in a form including only minimum information. For example, as illustrated in (b) of FIG. 13, the controller 180 can output the notification information in a form of "A message has arrived" to simply notify only the reception of the message without including a recipient of the message or contents of the message. This output form may be referred to as a summary display state.

Further, as illustrated in (c) of FIG. 13, the face image detected by the low power image sensor 200 can correspond to a front face 1320. In this instance, the controller 180 can output the notification information in a form including the recipient of the message and the contents of the message. This output state may be referred to as a detail display state.

Therefore, the present invention can provide information in a proper form to the user based on the face of the user looking at the mobile terminal.

When the face image is continuously detected for a preset time or more, the controller 180 can switch the display unit 151 from the inactive state to the active state, and output an execution screen of a function associated with the event on the display unit 151 which has been switched into the active state. For example, as illustrated in (d) of FIG. 13, when the front face of the user is detected for a preset time or longer, the controller 180 can output an execution screen of a message application on the display unit 151. Accordingly, the present invention can execute an operation associated with an event merely by an operation of looking at the mobile terminal.

Figure 14:
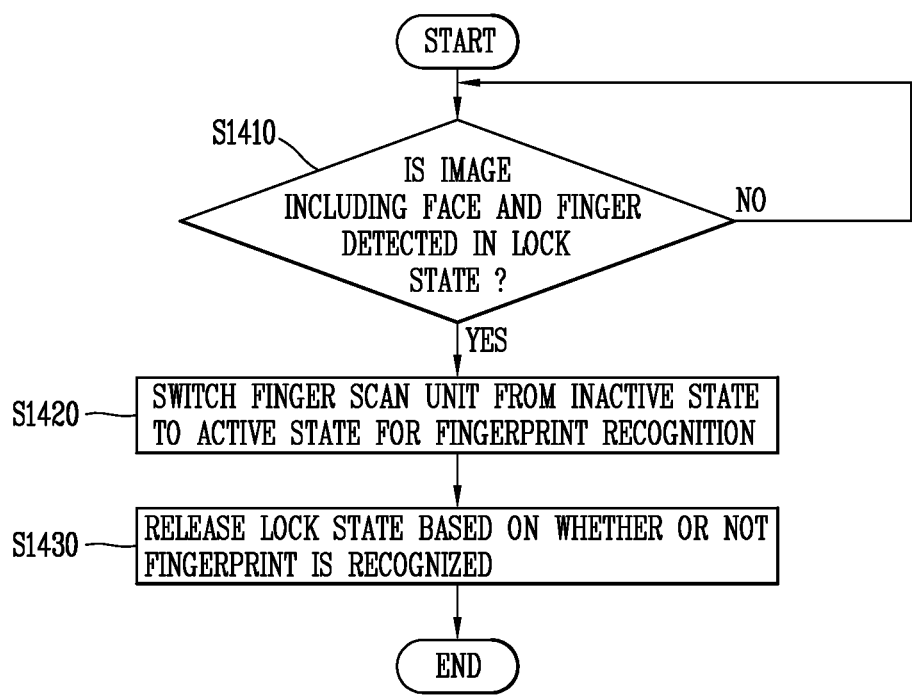
FIGS. 14 to 15C are views illustrating embodiments related to finger scanning.

The embodiments related to the always-on display unit have been described above. Hereinafter, embodiments related to a finger scan will be described. In particular, FIGS. 14 to 15C are views illustrating an embodiment related to a finger scan. The mobile terminal according to an embodiment of the present invention may further include a finger scan unit for a fingerprint recognition (finger scan). The finger scan unit may include a finger scan sensor and a user input unit.

Further, the finger scan unit may be located on a rear surface of a window of the display unit to detect a user's fingerprint applied to the display unit 151 or to detect the user's fingerprint applied to a home key. In addition, the present invention can control an active state of the finger scan unit based on an image detected by the low power image sensor. Here, the active state of the finger scan unit may include an active state in which a fingerprint can be scanned and an inactive state in which the fingerprint cannot be scanned.

More specifically, referring to FIG. 14, the controller 180 can determine whether an image including a face and a finger is detected through the low power image sensor in a lock state of the mobile terminal (S1410). For example, as illustrated in (a) of FIG. 15A, the low power image sensor can capture an image including a user's finger and face. In this instance, the controller 180 can analyze the image captured by the low power image sensor 200, and detect the face and finger from the captured image based on the analysis result.

When the face and the finger are detected, the controller 180 can switch the finger scan unit from an inactive state to an active state in order to recognize a fingerprint (S1420). As illustrated in (b) of FIG. 15A, when the user's finger touches the display unit 151 in the activated state of the finger scan unit, the controller 180 can detect fingerprint information related to the contacted finger.

The controller 180 can release the lock state based on whether the user's fingerprint is recognized (S1430). When the fingerprint recognition is executed in the lock state of the mobile terminal, the controller 180 can switch the lock state to a release (unlock) state. Therefore, the present invention can activate the finger scan unit only in a necessary state so as to reduce power consumption which is caused due to the activation of the finger scan unit at an unnecessary time point.

For example, when the detected fingerprint information matches pre-stored fingerprint information, the controller 180 can determine that the fingerprint recognition has successfully been executed. Then, as illustrated in (c) of FIG. 15A, the controller 180 can release the lock state to switch the mobile terminal from the lock state to the release state. Here, the release state is a state opposite to the lock state, and indicates a user input can be received. Since the release state can receive user inputs, various functions of the mobile terminal can be executed according to the user inputs.

Figure 15A:
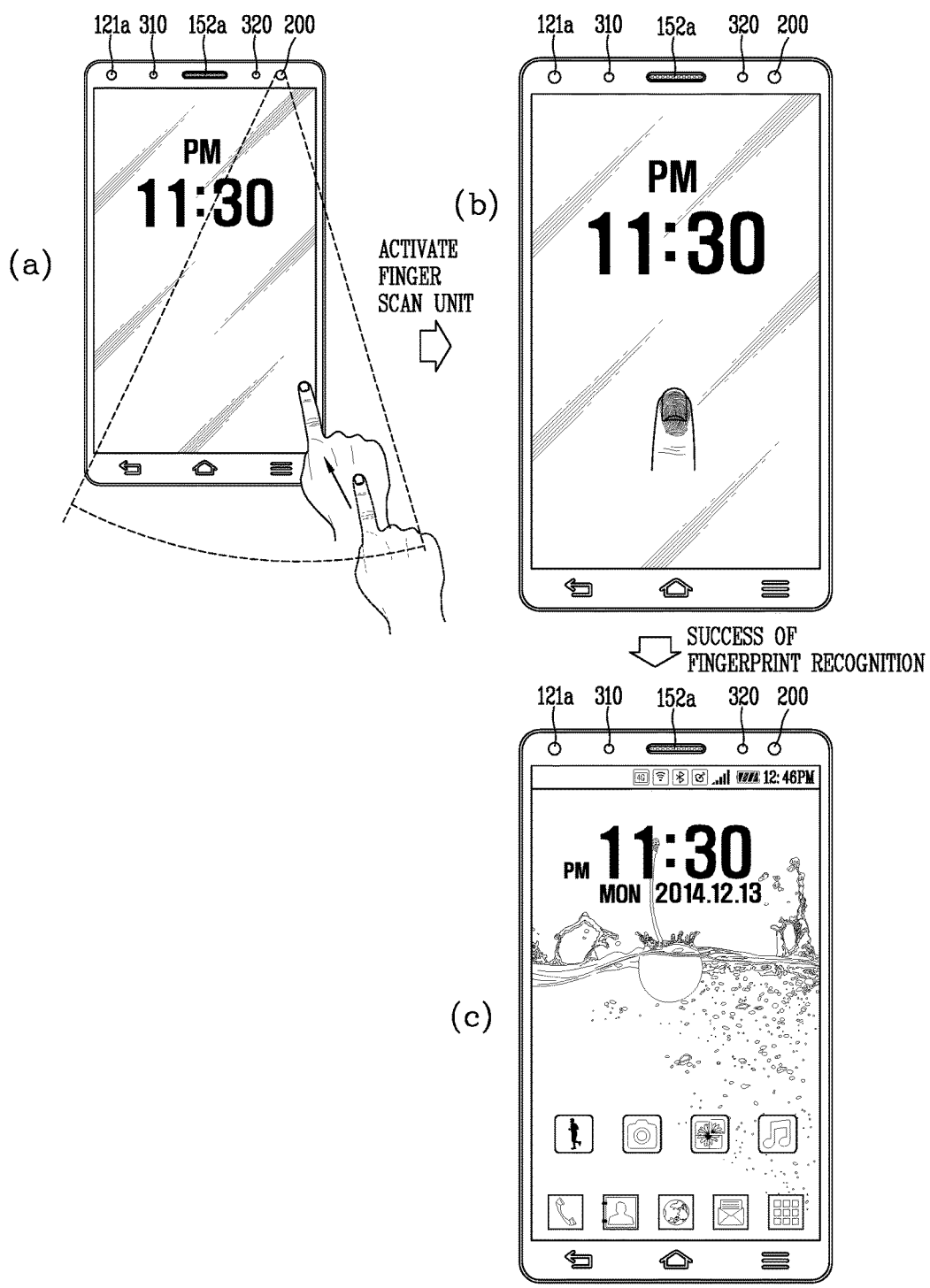
Figure 15C:
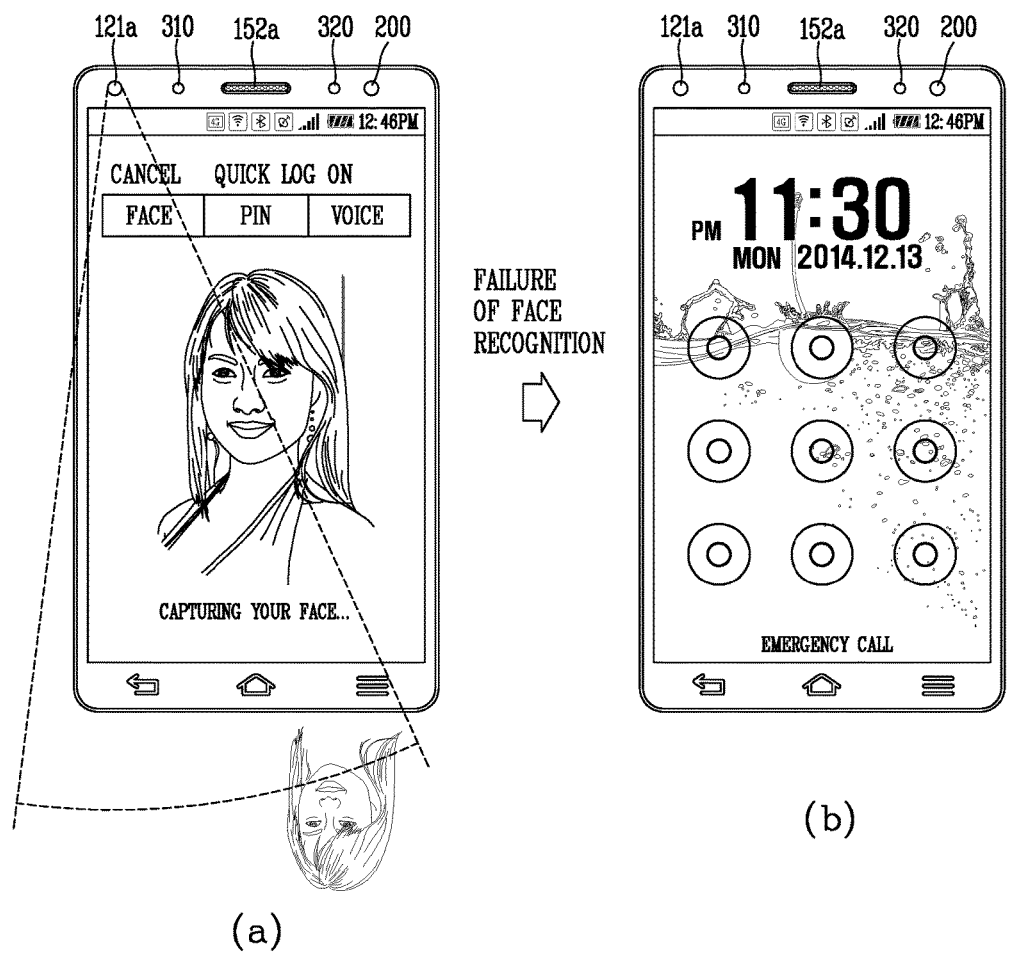

In addition, when the state of the mobile terminal is switched to the release state, an execution screen of the currently-executed application can be output on the display unit 151, or a home screen page can be output as illustrated in (c) of FIG. 15A.

In addition, the controller 180 of the mobile terminal according to an embodiment of the present invention can change an authentication method for releasing the lock state through the low power image sensor. The authentication method may include biometric authentication or password information authentication, such as iris recognition, fingerprint recognition (finger scanning), face recognition, password input, pattern input, and the like. In addition, various other authentication methods may be applied. The authentication method for releasing the lock state may be preset.

For example, as illustrated in (a) of FIG. 15B, the controller 180 can receive fingerprint information to switch the lock state of the mobile terminal to the release state. In this instance, when the fingerprint information does not match the prestored fingerprint information, the controller 180 can start the face recognition. For example, as illustrated in (b) of FIG. 15B, when it is determined that the fingerprint recognition has failed, the controller 180 can activate the front camera 121a for the face recognition. When the face recognition is succeeded, the controller 180 can switch the lock state to the release state as illustrated in (c) of FIG. 15B.

Further, when the face recognition fails, the controller 180 can change the authentication method to another one. For example, as illustrated in (a) and (b) of FIG. 15C, when the face recognition fails, the controller 180 can output screen information for inputting a pattern. Therefore, the present invention can provide an appropriate authentication method according to a situation, without insisting only one authentication method when switching the lock state to the release state.

The embodiment of releasing the lock state has been described above. Hereinafter, an embodiment of maintaining the release state will be described. In particular, FIGS. 16A and 16B are views illustrating embodiments related to the maintenance of the release state.

The controller 180, as illustrated in FIGS. 14 to 15C, can restrict an entry of the mobile terminal into the lock state based on a preset condition being satisfied after switching the lock state to the release state. That is, when the preset condition is satisfied, the controller 180 can maintain the release state without entering the lock state, even if the display unit 151 of the mobile terminal is turned off.

The preset condition may be that a face image is detected through the low power image sensor 200 in the release state. For example, as illustrated in (a) and (b) of FIG. 16A, the controller 180 can detect a face image through the low power image sensor 200 after the lock state is switched to the release state based on fingerprint recognition. In this instance, as illustrated in (b) of FIG. 16A, the controller 180 can turn off the display unit 151 in response to a user request to turn off the display unit 151.

Figure 16A:
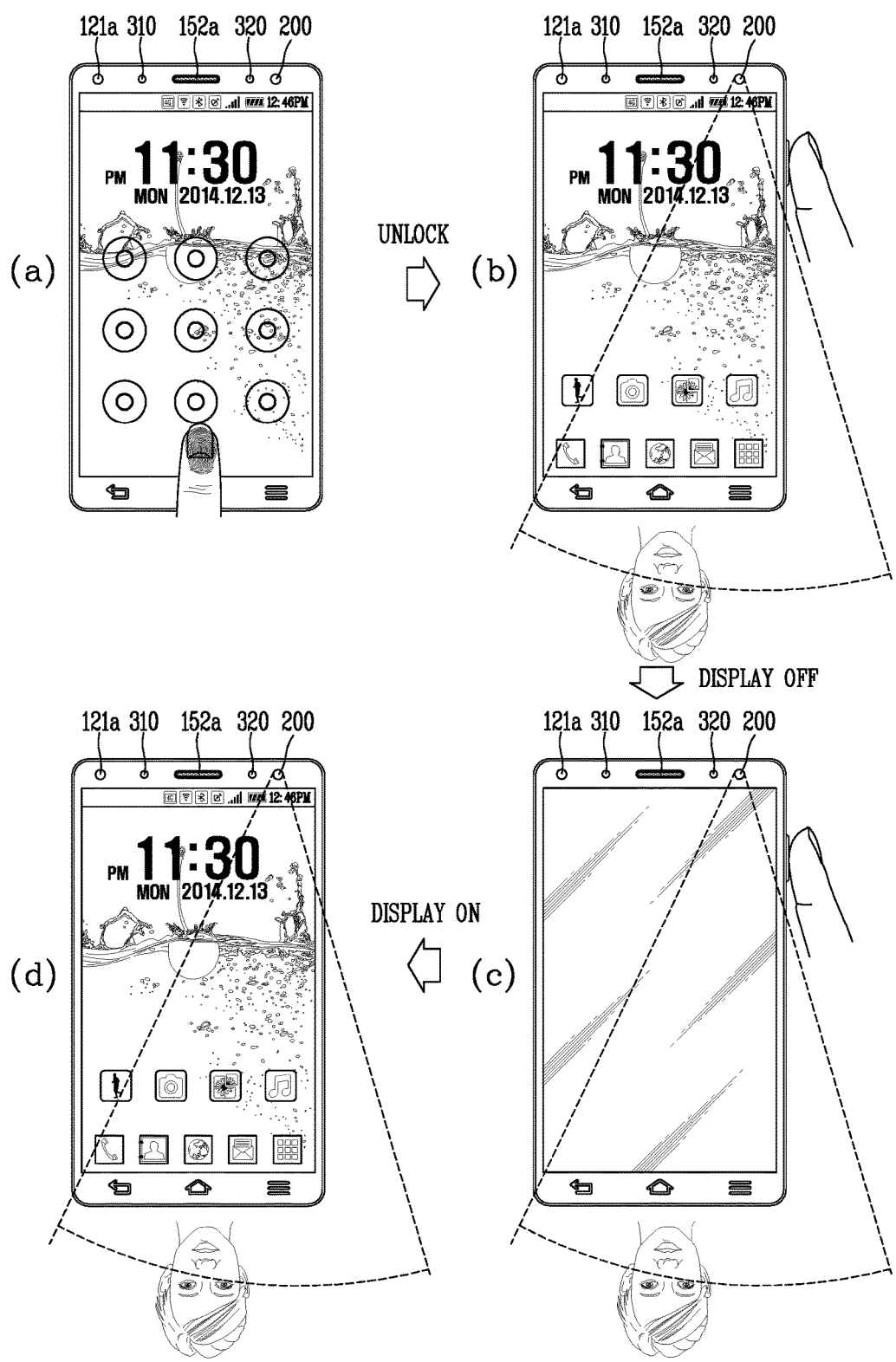

In this instance, as illustrated in (c) of FIG. 16A, the display unit 151 may be turned off. In addition, when the face image is continuously detected through the low power image sensor 200, the controller 180 can not enter the lock state. Therefore, as illustrated in (c) and (d) of FIG. 16A, when the display unit 151 is turned on in response to a user request to turn on the display unit 151, screen information which has been output just before the display unit 151 is turned off, other than a lock screen, can be output as it is on the display unit 151.

That is, according to whether the face image is detected through the low power image sensor, whether the user continuously uses the mobile terminal can be determined. In addition, when it is determined that the user is continuously using the mobile terminal, the present invention can maintain the release state of the mobile terminal so that the user can continuously use the mobile terminal. Accordingly, when the user is continuously using the mobile terminal, the user can conveniently use the mobile terminal even without inputting authentication information for releasing the lock state.

In addition, the present invention can apply a similar function to a watch-type terminal. A controller of the watch-type terminal can switch a lock state and a release state depending on whether the watch-type terminal is worn on a wrist. More specifically, the controller of the watch-type terminal may maintain the lock state when the watch-type terminal is not worn on the wrist. Whether the watch-type terminal is worn on the wrist can be detected through an infrared sensor located on a rear surface of a main body of the watch-type terminal.

In addition, the controller 180 of the watch-type terminal can restrict an entry into the lock state based on a preset condition after the lock state is switched to the release state by preset authentication means while the watch-type terminal is worn on the wrist. The preset condition is that a user's face image is continuously detected in the release state.

For example, as illustrated in (a) of FIG. 16B, the watch-type terminal can be in the release state while being worn on the user's wrist. In this instance, the display unit 151 can output screen information indicating the release state. The screen information indicating the release state may be an execution screen of an application or a home screen page.

Further, as illustrated in (b) of FIG. 16B, the watch-type terminal can be detached from the user's wrist. The controller of the watch-type terminal can restrict the watch-type terminal from entering the lock state when the user's face image is continuously detected from the release state to a time point that the watch-type terminal is detached from the wrist. That is, as illustrated in (b) of FIG. 16B, the watch-type terminal can be maintained in the release state. Therefore, the screen information indicating the release state can be continuously output on the display unit 151 as well.

Accordingly, the present invention can prevent an unnecessary entry into the lock state in a situation where the user continuously uses the mobile terminal, thereby improving the user convenience.

Hereinafter, an embodiment related to capturing of a subject will be described. In particular, FIG. 17 is a conceptual view illustrating an embodiment related to capturing of a subject. The controller 180 can detect situation information using the low power image sensor. The situation information may be information related to an object adjacent to the mobile terminal, motion information related to the mobile terminal, or the like.

The controller 180 can decide whether or not to activate the camera of the mobile terminal for capturing a specific subject based on the situation information. Then, the controller 180 can capture the specific subject by activating the camera, and output information related to the captured specific subject on the display unit 151.

The specific subject may be a quick response (QR) code. In more detail, the QR code is a code that stores various information such as photos, videos, maps, business cards, and the like using length and breadth of a two-dimensional rectangular configuration.

For example, as illustrated in (a) of FIG. 17, the controller 180 can detect presence of a QR code near the mobile terminal through the low power image sensor 200. In addition, the controller 180 can sense only a slight movement of the main body of the mobile terminal, due to a hand tremble, through the low power image sensor 200 or a motion sensor. In this instance, as illustrated in (a) of FIG. 17, the controller 180 can activate the front camera 121b and capture the QR code. As illustrated in (b) of FIG. 17, the controller 180 can thus extract information related to the QR code based on the captured QR code image, and output information related to the extracted QR code on the display unit 151.

Thus, the present invention can improve the user convenience by activating the camera to capture the QR code, even if the user does not directly activate the camera for capturing the QR code.

Hereinafter, a method of executing the face recognition using the low power image sensor will be described. In particular, FIGS. 18A and 18B are views illustrating embodiments related to the face recognition.

The controller 180 can determine in the lock state whether the face recognition is necessary based on the low power image sensor 200. In more detail, as illustrated in a top drawing of (a) of FIG. 18A, when a face image detected by the low power image sensor 200 corresponds to a side face in the lock state of the mobile terminal, the controller 180 can determine that the face recognition is not required. On the contrary, as illustrated in a top drawing of (b) of FIG. 18A, when the face image detected by the low power image sensor 200 corresponds to a front face in the lock state of the mobile terminal, the controller 180 can determine that the face recognition is required.

When it is determined that the face recognition is required, the controller 180 can activate the front camera 121a for the face recognition. As illustrated in (b) of FIG. 18A, the controller 180 can output screen information for the face recognition on the display unit 151.

When the face recognition is successful, the controller 180 can switch the lock state to the release state. As illustrated in (c) of FIG. 18A, the controller 180 can output screen information (e.g., home screen page) related to the release state on the display unit 151.

Alternatively, the controller 180 can detect a face image through the low power image sensor 200 when screen information requiring for authentication is output on the display unit 151 or a function requiring for authentication is executed. For example, as illustrate in (a) of FIG. 18B, the display unit 151 can output screen information requiring for authentication for payment approval. In this instance, the controller 180 can detect the user's face image through the low power image sensor 200 and determine whether the face image corresponds to a front face.

As illustrated in (a) of FIG. 18B, when the face image does not correspond to the front face, the controller 180 can not start the face recognition. Accordingly, the controller 180 does not activate the front camera 121a.

However, as illustrated in (b) of FIG. 18B, when the face image corresponds to the front face, the controller 180 can start the face recognition. Further, the controller 180 can activate the front camera 121a. When the front camera 121a is activated, the controller 180 can capture the face image through the front camera 121a and determine whether the captured face image matches a prestored face image. When the captured face image matches the pre-stored face image, the controller 180 can determine that the face authentication has successfully been executed. Therefore, as illustrated in (c) of FIG. 18B, the controller 180 can approve the payment. Accordingly, the present invention can perform the face recognition by automatically determining the user's face image without a complicated procedure, thereby improving the user convenience.

Hereinafter, an embodiment for performing various operations based on a face image detected through the low power image sensor will be described. In particular, FIG. 19 illustrates an embodiment related to a ringtone, and FIG. 20 illustrates an embodiment related to security.

The controller 180 can always detect a user's face image through the low power image sensor 200 even using low power. Accordingly, the controller 180 can control the operation of the mobile terminal based on the user's face image.

The operation of the mobile terminal may be an operation related to an application executed on the mobile terminal, or an operation related to a setting state of the mobile terminal itself. For example, the operation of the mobile terminal may be an operation to execute a message application. In another example, the operation of the mobile terminal may be an operation of adjusting a volume of the mobile terminal.

For example, as illustrated in (a) of FIG. 19, when a call signal is received, the controller 180 can output a ringtone at a first volume through a speaker. The controller 180 can detect a face image through the low power image sensor 200. When the detected face image is changed from a side face to a front face, the controller 180 can output the ringtone at a second volume lower than the first volume. That is, according to an embodiment of the present invention, when the user recognizes the reception of the call signal, the controller can 180 can determine that an output of a higher (louder) ringtone is no longer necessary, and thus automatically lower the volume of the ringtone.

In addition, when screen information with high security is being output on the display unit 151, the controller 180 can use the low power image sensor 200 to protect the screen information. In more detail, when it is determined that the screen information with the high security is highly likely to be leaked, based on detection information obtained by the low power image sensor 200, the controller 180 can control the display unit 151 not to output the screen information with the high security any more.

For example, as illustrated in (a) of FIG. 20, the display unit 151 can currently output screen information requiring for an input of password information. In this instance, the controller 180 can determine through the low power image sensor 200 whether two or more face images are detected in front of the mobile terminal, in order to maintain security of the password information. For example, as illustrated in (b) of FIG. 20, the low power image sensor 200 can determine whether two or more face images are detected within the FOV range thereof.

As illustrated in (b) of FIG. 20, when two or more face images are detected, the controller 180 can determine that the password information is highly likely to be leaked to another person as well as the user and restrict the output of the screen information requiring for the input of the password information. Instead, the controller 180 can output screen information without any relation to the password information, instead of the screen information requiring for the input of the password information. For example, as illustrated in (c) of FIG. 20, the controller 180 can output a home screen page. Alternatively, a preset image can be output instead. This may be set by the user.

Hereinafter, an embodiment of using a low power image sensor in a watch-type terminal equipped with the low power image sensor will be described. In particular, FIGS. 21A and 21B illustrate an embodiment related to a watch-type terminal.

The mobile terminal according to an embodiment of the present invention can include a watch type terminal that is wearable on a wrist. The watch type terminal may have one or more of the components of the mobile terminal described in FIG. 1A. Hereinafter, general description thereof is replaced with the description of FIG. 1A when using the same names as those of the components described in FIG. 1A.

First, the watch-type terminal may include a low power image sensor 200, a controller, and a display unit. The controller of the watch-type terminal can detect a user's face image through the low power image sensor 200 while the watch-type terminal is worn on a wrist. In this instance, the controller of the watch-type terminal can determine through an infrared sensor whether or not the watch-type terminal is worn. For example, as illustrated in FIG. 21A, the controller of the watch-type terminal can detect the user's face image through the low power image sensor 200. When the user's face image is not detected by the low power image sensor 200, the display unit can determine that the user is not using the watch-type terminal and control the display unit not to output visual information.

In addition, as illustrated in (b) of FIG. 21A, when the face image of the user is detected by the low power image sensor 200, the controller of the watch-type terminal can determine that the user is looking at the watch-type terminal and output basic information on the display unit 351. The basic information refers to preset information such as time information and date information.

In the output state of the basic information, the controller can determine that the user's face is getting closer to the watch-type terminal based on an enlargement of the user's face image detected through the low power image sensor 200. In this instance, as illustrated in (c) of FIG. 21A, the controller can output a menu screen (or a home screen page) on the display unit 351. The menu screen may be screen information including at least one icon or widget.

As illustrated in (d) of FIG. 21A, the controller can control the display unit not to output visual information again when the user's face image is no longer detected. Accordingly, the user may receive simple information through the display unit of the watch-type terminal without a direct contact with the watch-type terminal.

In addition, the controller of the watch-type terminal can detect a user's gaze direction from the face image detected through the low power image sensor 200. Specifically, the controller of the watch-type terminal can analyze the face image based on a preset image analysis algorithm, and detect a gaze direction of the pupil from the face image. Since the image analysis algorithm can be a well-known algorithm, detailed description thereof will be omitted in the present invention.

When the face image is detected, the controller 180 of the watch-type terminal can output visual information on the display unit based on the gaze direction, other than immediately outputting the visual information on the display unit 351. For example, as illustrated in (a) of FIG. 21B, the controller 180 can not output visual information on the display unit when the user's gaze is not directed to the watch-type terminal even though the face image is not detected through the low power image sensor 200. Further, as illustrated in (b) of FIG. 21B, when the face image is detected by the low power image sensor 200 and the user's gaze is directed to the watch-type terminal, the controller 180 can output visual information on the display unit 351. Accordingly, the present invention can provide the visual information to the user only when the user looks at the watch-type terminal, thereby providing the visual information at an appropriate time point. Therefore, unnecessary power consumption can be prevented.

Hereinafter, a user interface using a gaze direction detected through the low power image sensor will be described. In particular, FIGS. 22A to 22F illustrate embodiments related to the gaze direction.

The controller 180 can analyze a face image detected by the low power image sensor using a preset image algorithm, and detect a direction of the user's gaze from the analysis result. The controller 180 can control an output state of screen information based on the direction of the user's gaze.

For example, the controller 180 can scroll the screen information based on the direction of the user's gaze. As illustrated in (a) of FIG. 22A, the controller 180 can detect a position of the currently-displayed screen information, to which the user's gaze is directed.

Figure 22A:
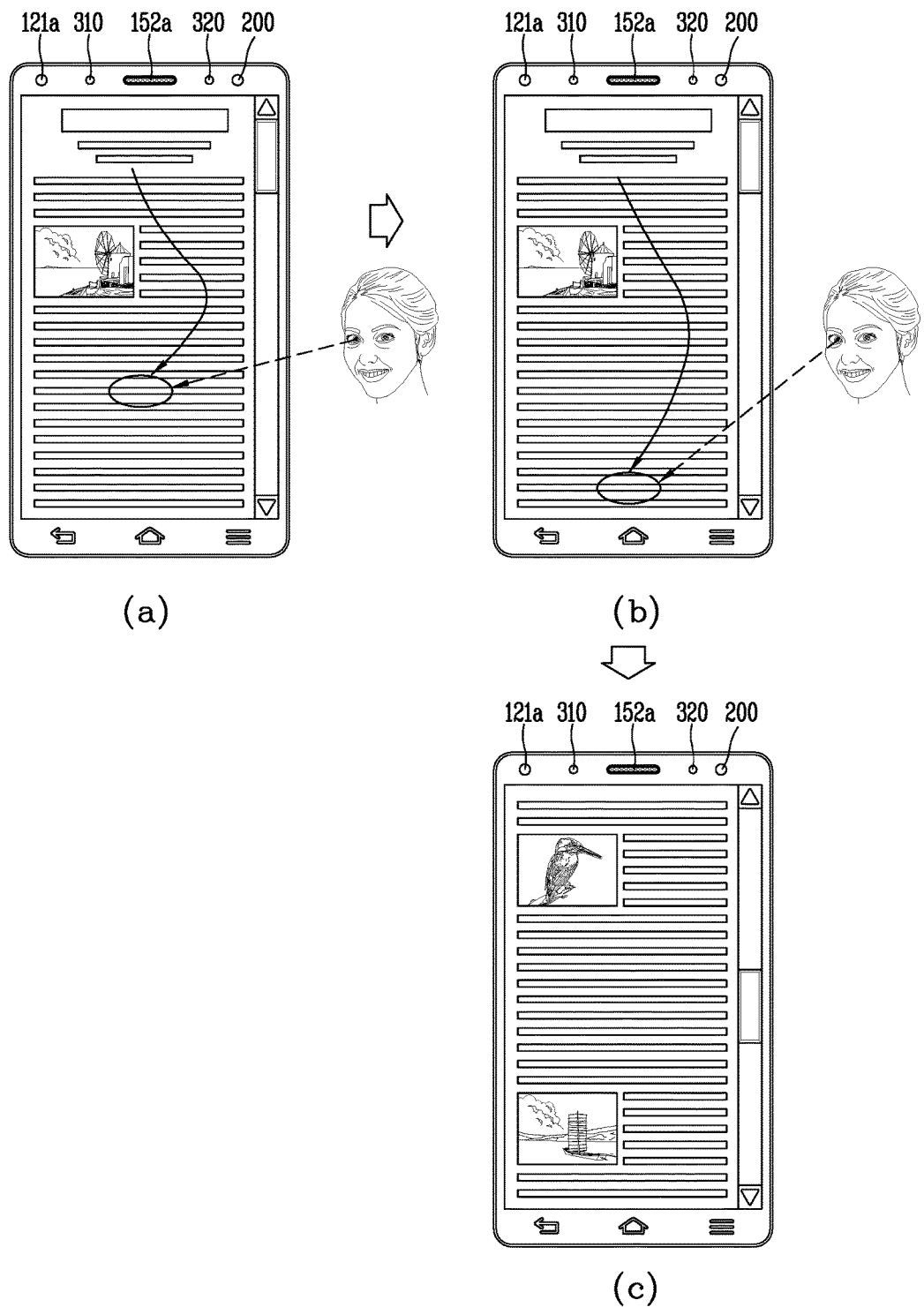
FIGS. 22A to 22F are views illustrating embodiments related to a gaze direction.

As illustrated in (b) of FIG. 22A, the controller 180 can scroll the screen information when the user's gaze is directed to the lowermost end of the currently-displayed screen information. In this instance, the scrolled screen information can be output on the display unit 151 as illustrated in (c) of FIG. 22A.

As another example, the controller 180 can decide an enlarged position of the screen information based on the direction of the user's gaze. Referring to (a) of FIG. 22B, the controller 180 can detect a specific area 2210, to which the user's gaze is directed, on the currently-displayed screen information.

Figure 22B:
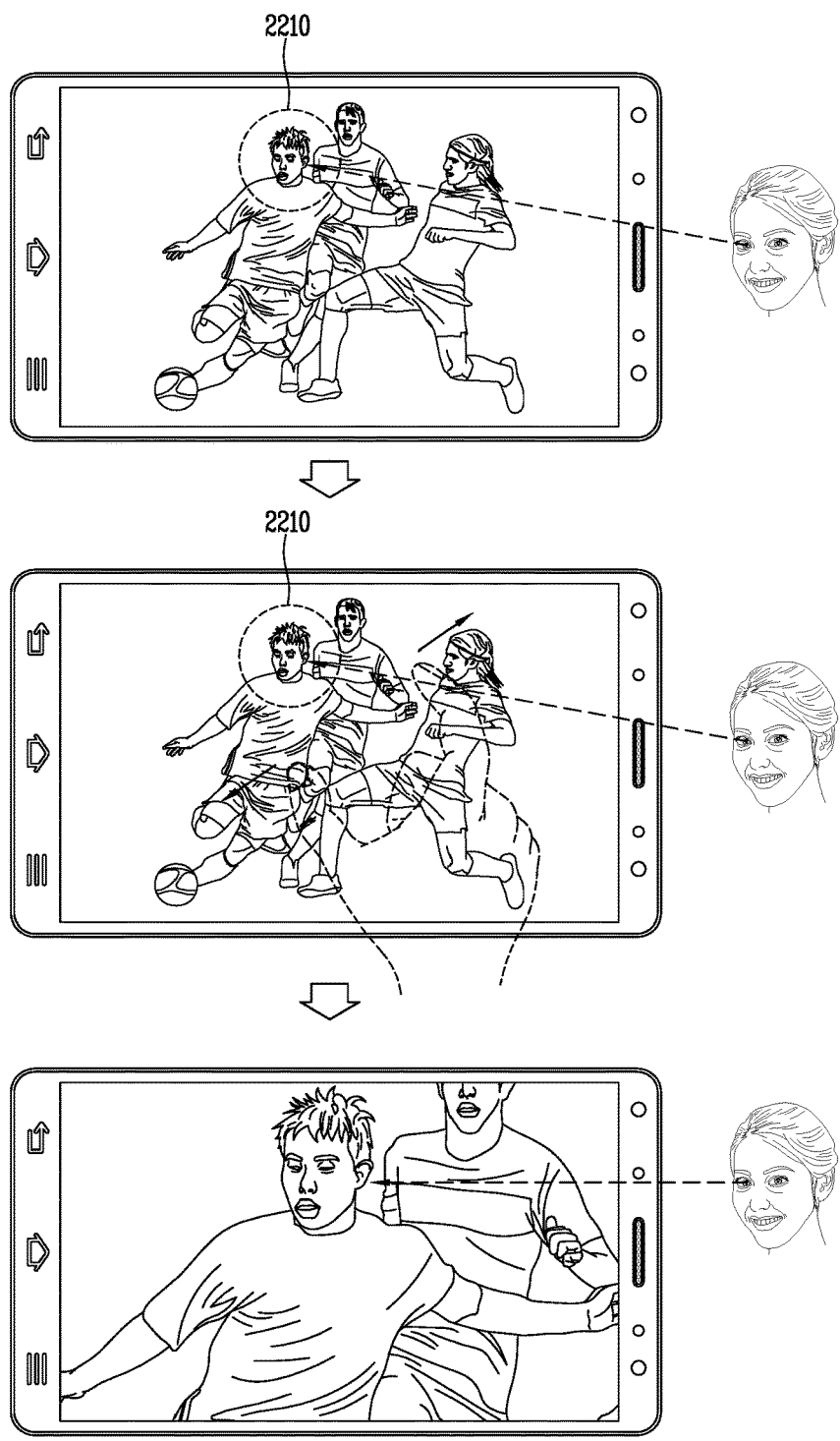

In addition, as illustrated in (b) of FIG. 22B, the controller 180 can enlarge the screen information in response to a pinch-out touch applied on the display unit 151. In this instance, the controller 180 can enlarge the screen information around the specific area 2210. That is, as illustrated in (c) of FIG. 22B, the controller 180 can output a screen enlarged based on the specific area 2210 on the display unit 151. Therefore, the present invention can more enlarge an area of interest of the user using user gaze information, thereby providing more accurate and effective information to the user.

As another example, the controller 180 can control a scroll direction of screen information. Referring to (a) of FIG. 22C, the currently-displayed screen information may be map information which is scrollable up, down, left, and right. The controller 180 can detect that the user's gaze is directed to a lower left area.

Figure 22C:
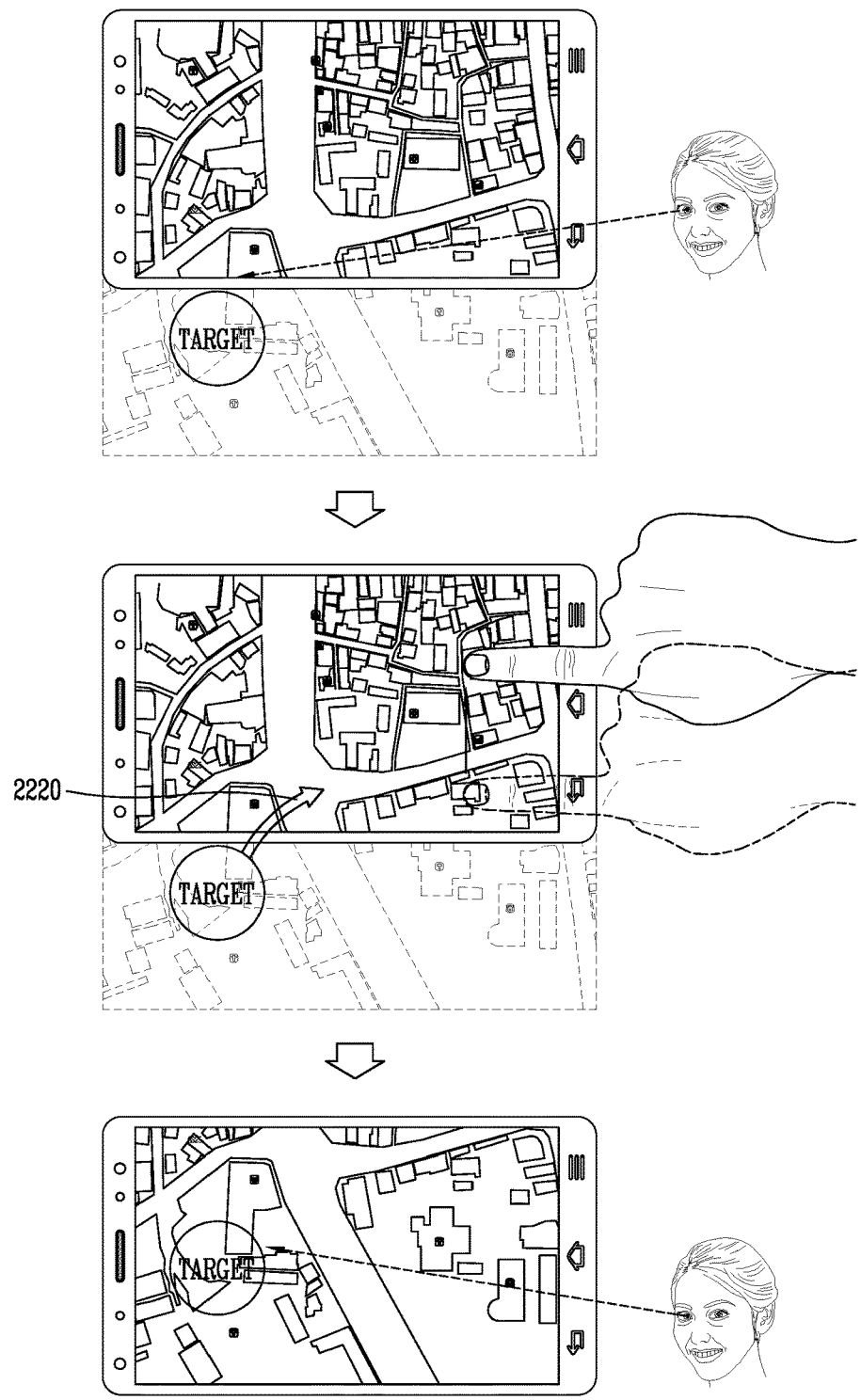

Then, as illustrated in (b) of FIG. 22C, the controller 180 can scroll the screen information based on a drag input applied upward. In this instance, the controller 180 can scroll the screen information so that the area directed by the user's gaze is output, other than scrolling the screen information in a direction corresponding to the applied direction of the drag input. That is, the controller 180 can scroll the screen information in an arrow direction 2220 illustrated in (b) of FIG. 22C.

As illustrated in (c) of FIG. 22C, the controller 180 can scroll the screen information so that screen information located at a left lower portion based on the currently-output screen information is output on the display unit 151. Therefore, the present invention can more easily perform scrolling in a direction in which information desired by a user is displayed.

As another example, when a touch input for selecting a specific item is applied when a list screen including a plurality of items is output, the controller 180 can select the specific item according to gaze information and a location of the touch input.

Figure 22D:
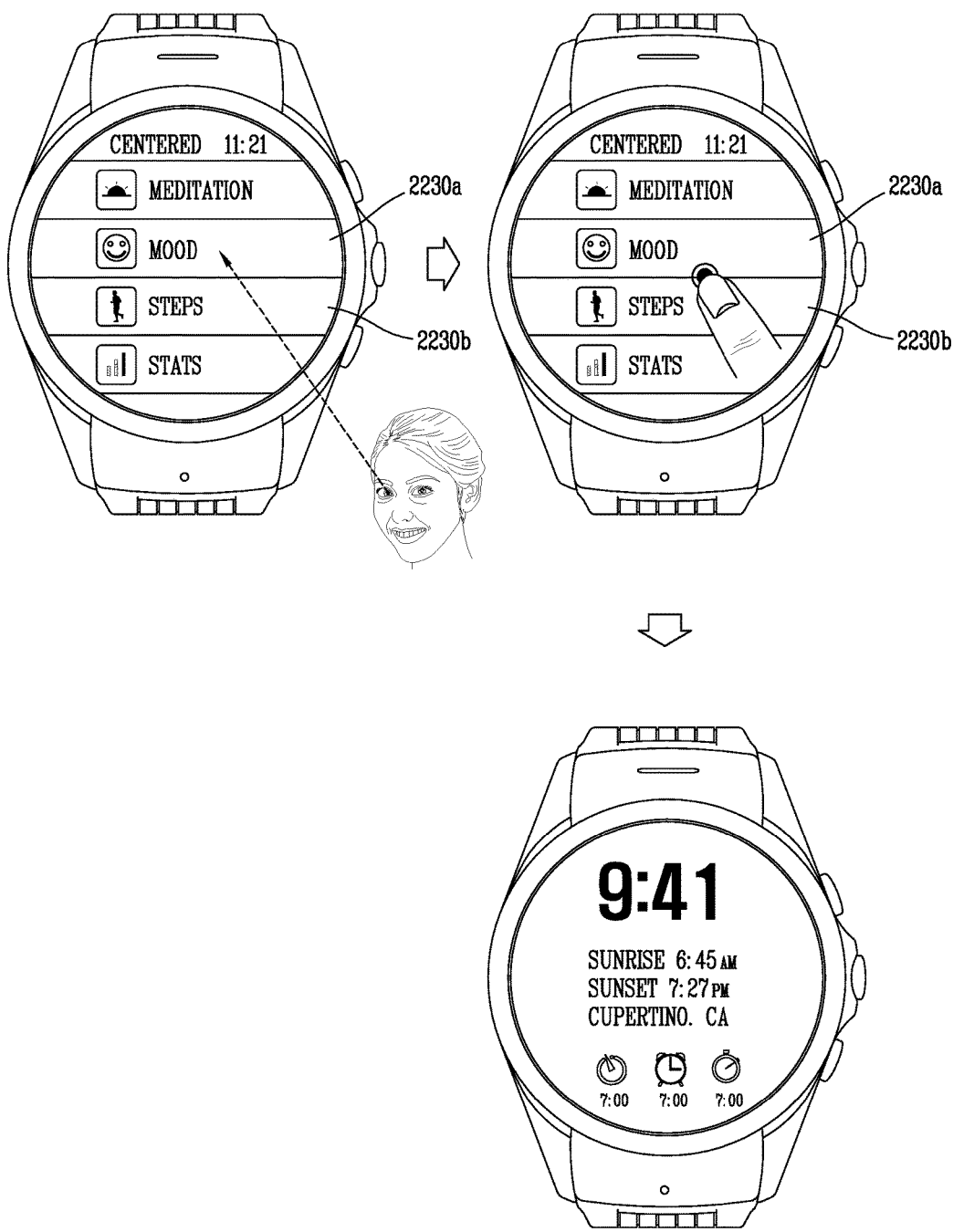

In more detail, as illustrated in (a) of FIG. 22D, while the list screen including the plurality of items is output, the controller 180 can detect a specific item 2230a output on an area to which the user's gaze is directed. As illustrated in (b) of FIG. 22D, the controller 180 can detect a touch input simultaneously applied to the output area of the specific item 2230a and an output area of another item 2230b different from the specific item. In this instance, the controller 180 can select the specific item 2230a, which is output in the user's gaze direction, of the specific item 2230a and the another item 2230b different from the specific item. That is, when a touch input is applied to two or more items at the same time in a state of giving a higher weight to the specific item 2230a output at a position to which the user's gaze is directed, the controller 180 can selectively execute only one item according to the weight.

As illustrated in (c) of FIG. 22D, the controller 180 can output screen information related to the specific item on the display unit 151. Even when a touch input is wrongly input, the present invention can recognize the user's intention based on the gaze direction and can help to execute a function suitable for the user's intention.

As another example, the controller 180 can analyze the user's gaze direction when scrolling a menu screen including a plurality of icons, and decide a recommended icon. Referring to (a) of FIG. 22E, the controller 180 can extract information on at least one icon 2240a and 2240b output in the user's gaze direction from a first icon set 2260 including a plurality of icons within the menu screen.

Figure 22E:
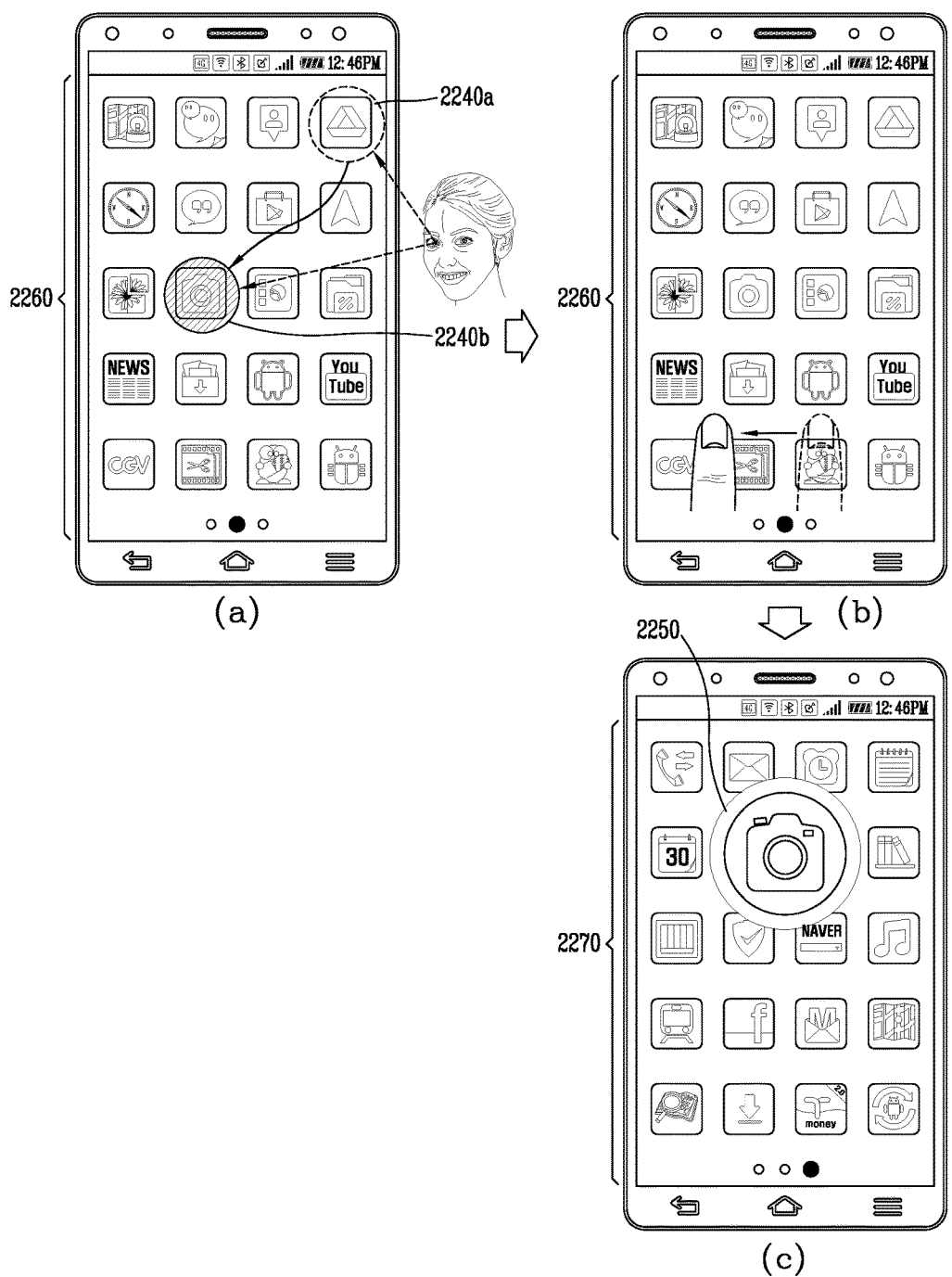
Figure 22F:
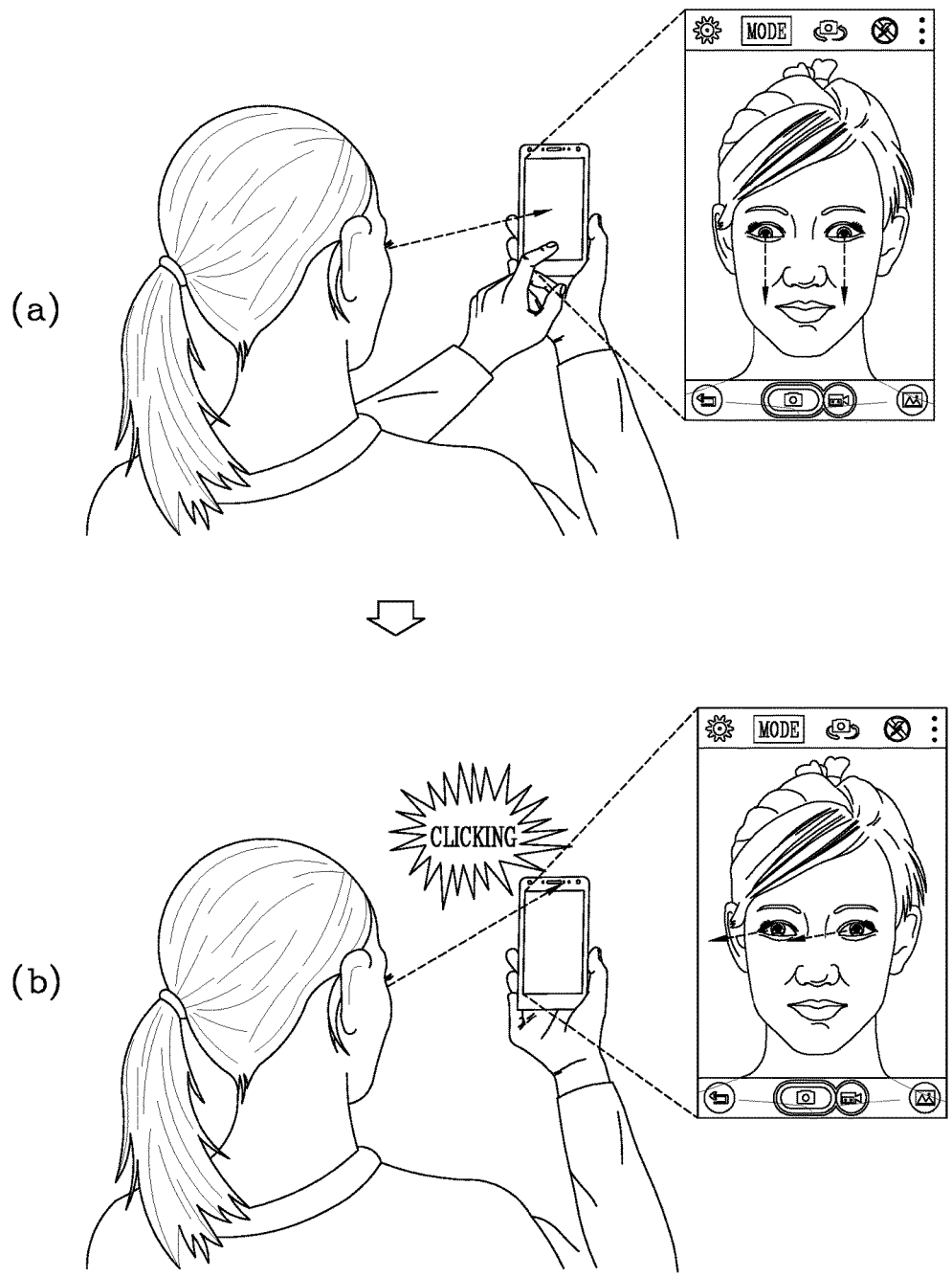

The controller 180, as illustrated in (b) of FIG. 22E, may output a menu screen including a second icon set 2270 different from the first icon set 2260, based on a drag input applied. In this instance, as illustrated in (c) of FIG. 22E, the controller 180 can extract a recommended icon 2250 from the second icon group 2270 based on icon information related to the extracted at least one icon 2240a and 2240b. The controller 180 can output the recommended icon 2250 to be visually distinguished from the second icon set 2270. Therefore, the present invention can help to search for an icon by outputting icons of interest of the user in a visually distinguishing manner.

As another example, the controller 180 can control a capturing time point based on the user's gaze direction when capturing using the front camera 121a. As illustrated in (a) of FIG. 22F, the controller 180 can detect that a capturing command is applied while the front camera 121a is activated.

When the capturing command is applied, the controller 180 can detect whether the user's gaze is directed to the front camera 121a through the low power image sensor 200. As illustrated in (b) of FIG. 22F, the controller 180 can perform image capturing when the user's gaze is directed to the front camera 121a. That is, according to an embodiment of the present invention, the image capturing can be performed when the user's gaze is directed to the front camera 121a, other than immediately performing the image capturing according to the capturing command. This may result in improving the user convenience upon the image capturing.

Figure 24:
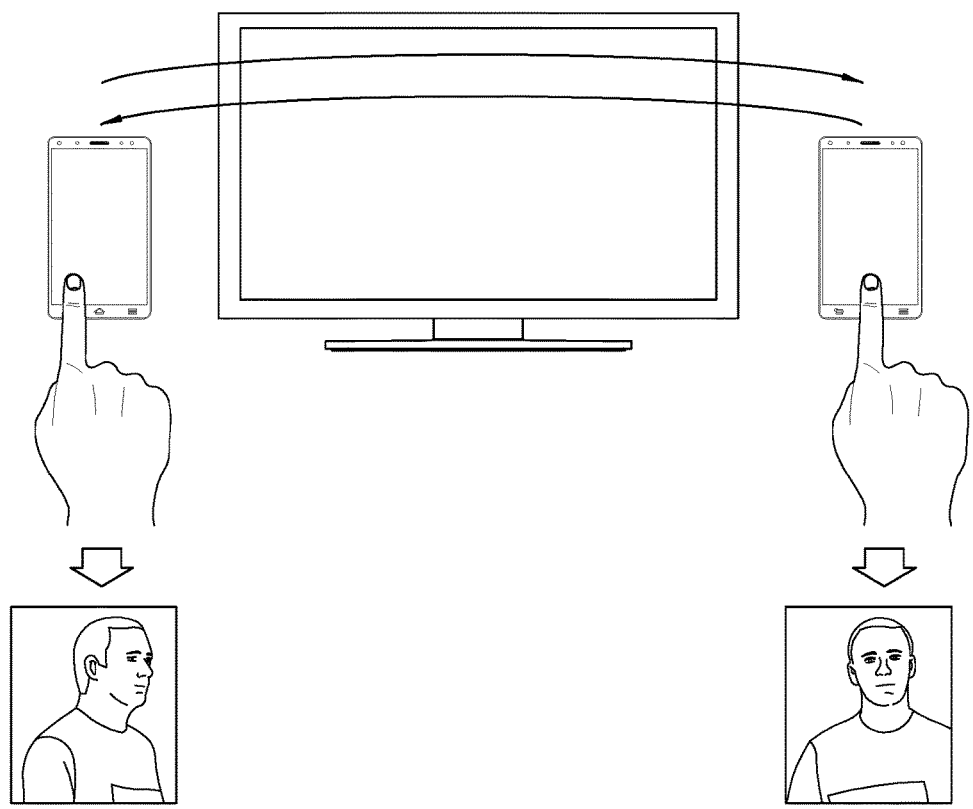

Hereinafter, a method of deciding an output direction of screen information according to a face direction will be described. In particular, FIGS. 23 and 24 illustrate embodiments of deciding an output direction of screen information according to a face direction. The controller 180 can detect a face image through the low power image sensor. In addition, the controller 180 can detect a face direction based on the detected face image.

The controller 180 can control an output direction of screen information based on the face direction. That is, the controller 180 can output the screen information in a direction corresponding to the face direction. For example, as illustrated in (a) of FIG. 23, the controller 180 can output the screen information in a first direction when the face direction of the user is the first direction. Also, as illustrated in (b) of FIG. 23, the controller 180 can output the screen information in a second direction when the face direction of the user is the second direction.

In addition, when an external device having a monitor and the mobile terminal share screen information, relative positions of the monitor and the mobile terminal may be determined by using the low power image sensor 200. The output position of the screen information to be output on the monitor and the display unit can be decided based on the relative positions of the mobile terminal and the external device having the monitor.

More specifically, the controller 180 can capture a user's face image by the external device having the monitor and the mobile terminal, respectively. Then, the controller 180 can compare the captured face images to determine the relative positions between the two devices.

For example, as illustrated in FIG. 24, when the external device having the monitor is located at a left side of the mobile terminal, the face image captured by the mobile terminal may differ from the face image captured by the monitor. Accordingly, when the mobile terminal and the external device having the monitor share screen information, the screen information can be output in a form suitable for the relative position of each device.

For example, as illustrated in FIG. 24, when one screen information is output on the monitor and the display unit, a left area of the one screen information can be output on the monitor and a remaining right area can be output on the mobile terminal. As another example, when screen information output on the mobile terminal is output on the monitor, the screen information output on the mobile terminal can be output on an area, adjacent to the mobile terminal, of an entire output area of the monitor.

Also, the controller 180 can detect a movement of the mobile terminal in the state that the relative positions are decided. In this instance, the controller 180 can reset the relative positions between the external device having the monitor and the mobile terminal. In this instance, the controller 180 can re-output the screen information based on the reset relative positions.

Hereinafter, a method of reproducing a video according to whether a face image is detected through a low power image sensor will be described. In particular, FIG. 25 illustrates an embodiment related to a moving image reproduction according to whether a face image is detected by a low power image sensor.

The controller 180 can reproduce a moving image or a video based on whether or not a face image is detected by the low power image sensor 200. The moving image may be one image in which a plurality of images are sequentially included in one file and set to be sequentially displayed. This type of image may also be referred to as a GIF image.

When the moving image is output on the display unit 151, the controller 180 can detect a face image through the low power image sensor 200. As illustrated in (a) of FIG. 25, when the face image is detected, the controller 180 can reproduce the moving image. The reproduction refers to an operation of sequentially outputting images included in the moving image.

Figure 25:
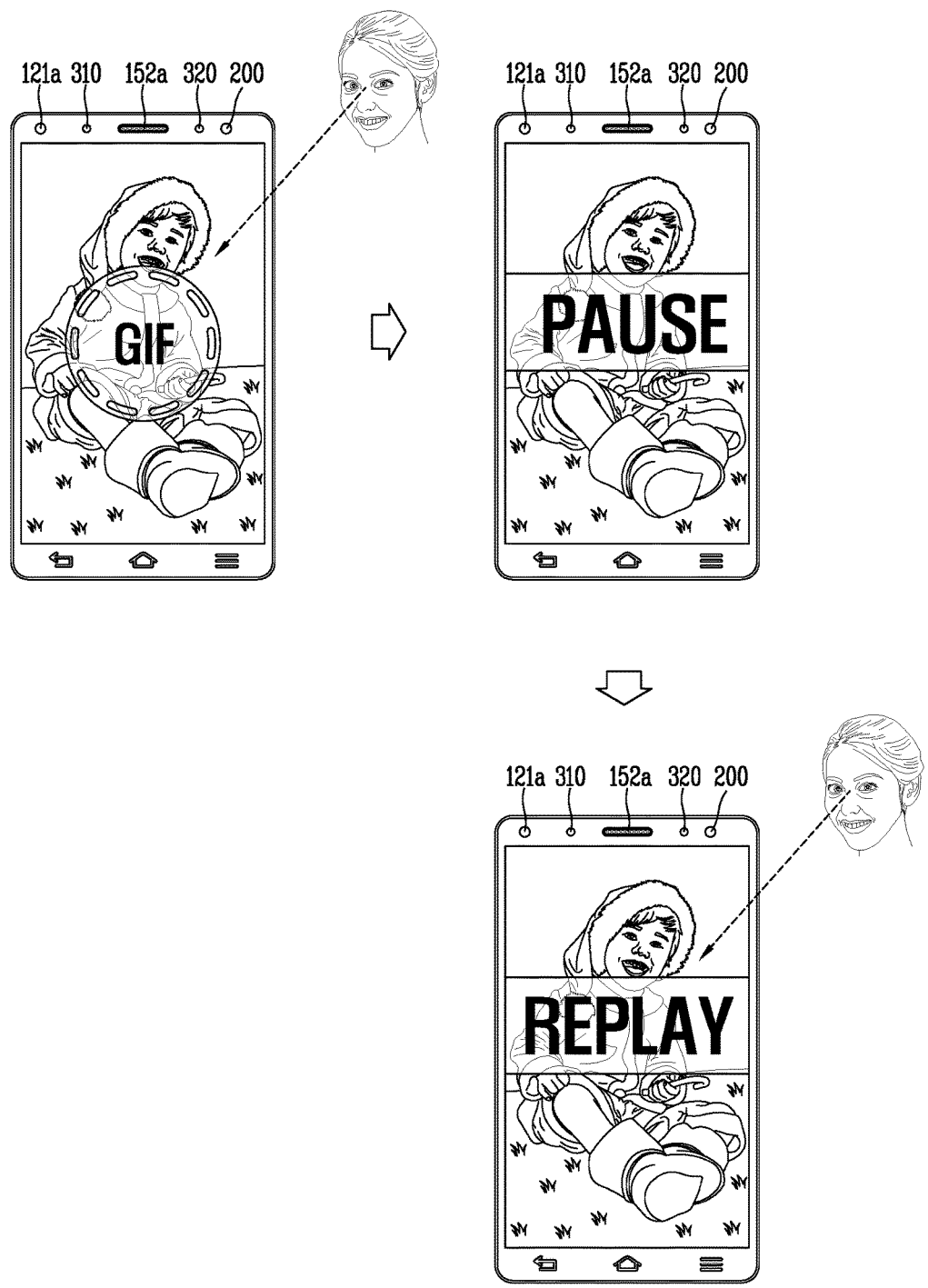
FIG. 25 is a view illustrating an embodiment related to a reproduction of a moving image according to whether a face image is detected by a low power image sensor.

Further, as illustrated in (b) of FIG. 25, when the user's face image is not detected during the reproduction of the moving image, the controller 180 can stop the reproduction of the moving image. That is, when the controller 180 determines that the user is not gazing at the moving image, the controller 180 can stop the reproduction of the moving image.

As illustrated in (c) of FIG. 25, the controller 180 can reproduce the moving image again, in response to the user's face image being detected again. In this instance, the reproduction of the moving image may be restarted from a time point that the reproduction has been stopped. Alternatively, the controller 180 can replay the moving image based on the fact that the user's face image is detected again for a preset time or longer, in the stopped state of the reproduction.

Accordingly, the present invention can provide an effect such as a moving image being continuously reproduced. This reproduction method may be applied not only to the moving image but also to a video. Also, the present invention can be equally applied to a reproduction method of a moving image which is uploaded to a website.

Figure 26B:
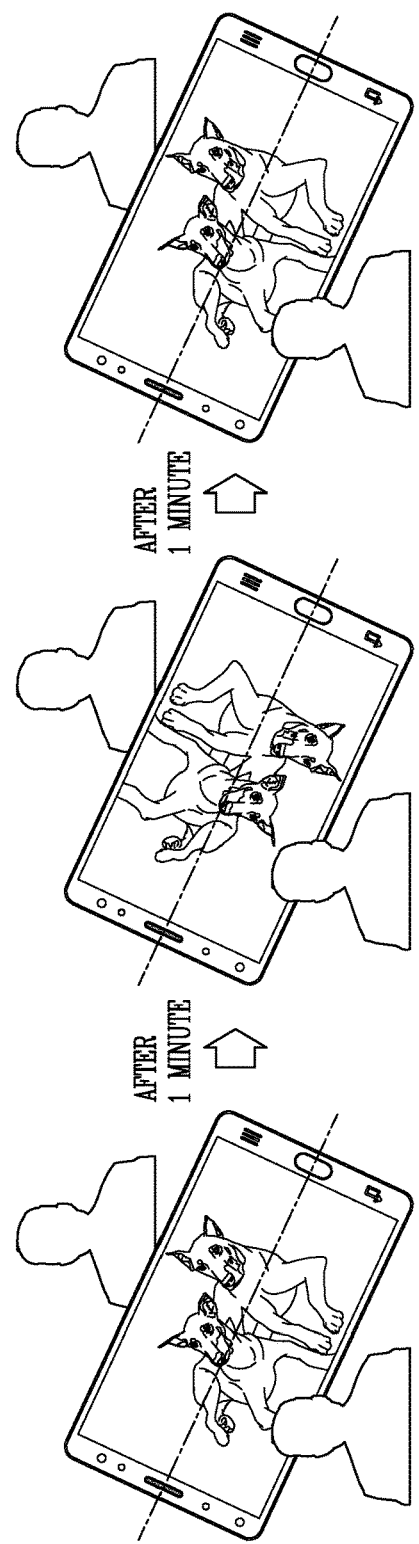
Figure 26C:
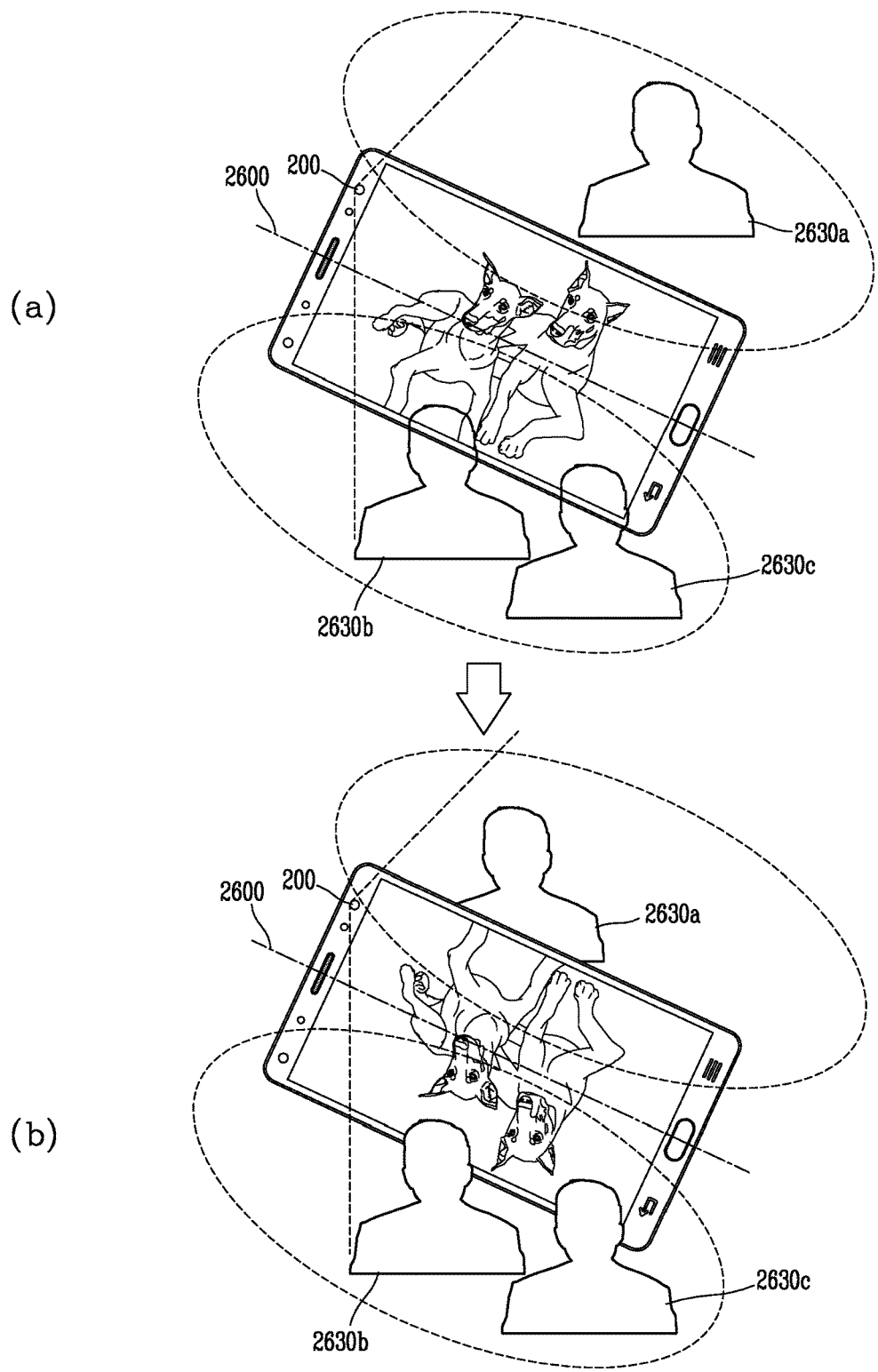

Hereinafter, a method of controlling an output direction of screen information when a plurality of users gaze at one screen together will be described. FIGS. 26A to 26C illustrate embodiments of deciding an output direction of a screen when a plurality of user faces are detected.

The controller 180 can decide an output direction of screen information to be output on the display unit 151 based on respective positions of a plurality of face images when the plurality of face images are detected by the low power image sensor.

For example, as illustrated in (a) of FIG. 26A, the controller 180 can detect three face images 2630a, 2630b and 2630c through the low power image sensor 200. In this instance, the controller 180 can detect relative positions of the three face images 2630a, 2630b and 2630c based on the display unit 151.

The controller 180 can determine whether the three face images are located in a first area 2610 or a second area 2620 based on a virtual line 2600. For example, as illustrated in (a) of FIG. 26A, it may be determined that two faces 2630a and 2630b are located in the first region 2610 and one face 2630c is located in the second region 2620 based on the virtual line 2600.

Then, the controller 180 can output screen information in a direction corresponding to an area where more persons are located. For example, as illustrated in (a) of FIG. 26A, when more persons are located at the first area 2610, the controller 180 can output the screen information in an output direction that the persons located at the first area 2610 based on the virtual line 2600 look at the screen information in a forward direction.

Or, as illustrated in (b) of FIG. 26A, when more persons are located at the second area 2620 based on the virtual line 2600, the controller 180 can output the screen information in an output direction that the persons located at the second area 2620 based on the virtual line 2600 look at the screen information in the forward direction.

In addition, two users may be located at different areas. That is, a plurality of users may exist in the same number at each area. For example, as illustrated in (a) of FIG. 26B, one user may exist at each of a first area and a second area. In this instance, as illustrated in (a) to (c) of FIG. 26B, the controller 180 can change the output direction of the screen information every preset time period. The time period may be set by the user.

Or, the controller 180 can decide the output direction of the screen information based on a relative distance between the user and the mobile terminal. For example, as illustrated in (a) of FIG. 26C, after face images of three users 2630a, 2630b and 2630c are detected through the low power image sensor 200, the controller 180 can determine the relative distance between the mobile terminal and the user based on sizes of the users' face images.

The controller 180 can output the screen information in an output direction in which a user having the shortest relative distance among the three users can view the screen information in a forward direction. For example, as illustrated in (b) of FIG. 26C, when the relative distance between the specific user 2630a and the mobile terminal becomes narrow while the screen information is output in a first direction, the controller 180 can output the screen information in a second direction in which the specific user 2630a can view the screen information in the forward direction. Accordingly, the screen information can be more effectively provided to the user who is interested in the current screen information.

According to the mobile terminal of the present invention as described above, the iris recognition sensor having the narrow FOV can be disposed on the center of the main body and the low power image sensor having the wide FOV can be disposed in the manner that the focal point thereof matches that of the iris recognition sensor. This results in supplementing the FOV of the iris recognition sensor, thereby improving accuracy of the iris recognition sensor and providing more convenient user experience.

Also, the present invention can detect the user's face position by utilizing the low power image sensor having the wide FOV, and provide guide information related to the iris recognition based on the detection result, thereby guiding the iris-recognizable position to the user desiring to perform the iris recognition. Therefore, a user who is not familiar with the iris recognition can be assisted to perform the iris recognition more conveniently.

Further, the present invention can detect the direction of the user's face by using the low power image sensor and control the active state of the always-on display according to the detection result, thereby reducing standby power consumed by the always-on display.

In addition, the present invention can detect information related to the user's gaze by using a low power image sensor, and control an output state of the screen information based on the detected gaze information, thereby providing more convenient user experience using low power.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a main body;
   a display disposed on the main body;
   a receiver disposed on the main body and located adjacent to the display;
   an infrared unit disposed on the main body at a first distance from the receiver in a first direction and configured to output infrared rays;
   an iris recognition sensor disposed on the main body at a second distance from the receiver in a second direction opposite the first direction and configured to receive infrared rays reflected from a subject;
   a low power image sensor disposed on the main body at a third distance from the receiver in the second direction and having a focal point matching a focal point of the iris recognition sensor, wherein the third distance is greater than the second distance; and
   a controller configured to:
   detect an occurrence of an event while the display is in an inactive state, wherein when the display is the inactive state, a backlight of the display is off such that visual information is not displayed,
   determine whether or not a face image is detected through the low power image sensor in response to the detection of the occurrence of the event,
   control one area of the display from the inactive state to an active state when the face image is detected, and
   display specific information related to the event on the one area of the display in the active state,
   wherein when the detected face image corresponds to the side face, the specific information is summary information related to the event, and
   wherein when the detected face image corresponds to a front face, the specific information is detail information related to the event.

2. The terminal of claim 1, wherein the low power image sensor is configured to capture the face image of the subject.

3. The terminal of claim 2, wherein the controller is further configured to lower a volume of a ringtone based on the face image detected through the low power image sensor when the ringtone is output through the receiver in response to a reception of a call signal.

4. The terminal of claim 1, wherein the first distance and the second distance are equal to each other.

5. The terminal of claim 1, further comprising:
   a front camera disposed on the main body at a fourth distance from the receiver in the first direction and configured to capture an image of the subject,
   wherein the fourth distance is greater than the first distance.

6. The terminal of claim 5, wherein the front camera has a same focal point as the focal point of the low power image sensor.

7. The terminal of claim 1, wherein the controller is further configured to:
   detect the face image through the low power image sensor, and
   display guide information for guiding the subject so the face image of the subject is within a field of view of the iris recognition sensor when the detected face image is not present within the field of view of the iris recognition sensor.

8. The terminal of claim 1, wherein the controller is further configured to:
   display authentication screen information on the display,
   detect a gaze directed to the authentication screen information through the low power image sensor, and
   execute iris recognition through the iris recognition sensor when the gaze directed to the authentication screen information is detected.

9. The terminal of claim 1, wherein the controller is further configured not to display the specific information related to the event when the face image is not detected through the low power image sensor.

10. The terminal of claim 1, wherein the controller is further configured to:
    detect gaze information based on the face image detected through the low power image sensor, and
    determine whether or not to display the specific information based on the detected gaze information.

11. The terminal of claim 1, wherein the controller is further configured to:
    switch the display from the inactive state to the active state when the face image is continuously detected through the low power image sensor.

12. The terminal of claim 1, further comprising:
    a camera; and
    a motion detecting sensor configured to detect a movement of the main body,
    wherein the controller is further configured to control the camera to capture the subject when the subject existing at a surrounding area of the main body is detected using the infrared rays and the movement of the main body corresponds to a preset motion.

13. The terminal of claim 1, further comprising:
    a camera having a narrower field of view than the low power image sensor,
    wherein the controller is further configured to:
    control the camera to capture a face image for the face recognition based on the face image detected through the low power image sensor.

14. The terminal of claim 13, wherein the controller is further configured to control the camera to capture the face image for the face recognition when a part of the face image detected through the lower power image sensor is present within the field of view of the camera.

15. The terminal of claim 13, wherein the controller is further configured to display guide information to allow the face recognition when a part of the face image detected through the lower power image sensor is not present within the field of view of the camera.

16. The terminal of claim 13, wherein the controller is further configured to:
    control the camera to capture the face image for the face recognition when the face image detected through the low power image sensor corresponds to a front face, and
    display guide information on the display to allow the face recognition when the face image detected through the low power image sensor does not correspond to the front face.

17. A method for controlling a mobile terminal, the method comprising:
    detecting an occurrence of an event while a display of the mobile terminal is in an inactive state, wherein when the display is the inactive state, a backlight of the display is off such that visual information is not displayed;
    determining whether or not a face image is detected through a low power image sensor of the mobile terminal in response to the detection of the occurrence of the event;
    controlling one area of the display from the inactive state to an active state when the face image is detected; and
    displaying specific information related to the event on the one area of the display in the active state,
    wherein when the detected face image corresponds to the side face, the specific information is summary information related to the event; and
    wherein when the detected face image corresponds to a front face, the specific information is detail information related to the event.

* * * * *